US008040843B2

(12) United States Patent
Furrer et al.

(10) Patent No.: US 8,040,843 B2
(45) Date of Patent: Oct. 18, 2011

(54) TRANSMIT SCHEME ADAPTATION FOR WIRELESS DATA TRANSMISSIONS

(75) Inventors: Simeon Furrer, Mountain View, CA (US); Joachim S. Hammerschmidt, Mountain View, CA (US)

(73) Assignee: Broadcom Corporation, Irvine, CA (US)

( * ) Notice: Subject to any disclaimer, the term of this patent is extended or adjusted under 35 U.S.C. 154(b) by 883 days.

(21) Appl. No.: 11/875,161

(22) Filed: Oct. 19, 2007

(65) Prior Publication Data

US 2008/0175189 A1    Jul. 24, 2008

Related U.S. Application Data

(60) Provisional application No. 60/881,715, filed on Jan. 21, 2007.

(51) Int. Cl.
*H04Q 7/00*   (2006.01)
*H04J 3/06*   (2006.01)
(52) U.S. Cl. ........................................ 370/329; 370/350
(58) Field of Classification Search .................. None
See application file for complete search history.

(56) References Cited

U.S. PATENT DOCUMENTS

| | | | |
|---|---|---|---|
| 2004/0132496 A1* | 7/2004 | Kim et al. .................. | 455/562.1 |
| 2004/0165575 A1* | 8/2004 | Yang et al. .................. | 370/349 |
| 2005/0032478 A1* | 2/2005 | Stephens et al. ........... | 455/67.11 |
| 2005/0160181 A1* | 7/2005 | Kwon et al. ................ | 709/238 |
| 2005/0186958 A1* | 8/2005 | Hansen et al. .............. | 455/426.2 |
| 2007/0224935 A1* | 9/2007 | Waxman ..................... | 455/41.2 |
| 2007/0254603 A1* | 11/2007 | Li et al. .......................... | 455/88 |
| 2008/0051129 A1* | 2/2008 | Abe et al. .................... | 455/550.1 |
| 2008/0254760 A1* | 10/2008 | Wu et al. ..................... | 455/343.1 |
| 2008/0304468 A1* | 12/2008 | Sun .............................. | 370/345 |

\* cited by examiner

*Primary Examiner* — Hassan Phillips
*Assistant Examiner* — Eunsook Choi
(74) *Attorney, Agent, or Firm* — Garlick Harrison & Markison; Bruce E. Garlick

(57) ABSTRACT

An integrated circuit radio transceiver and method therefor is operable to determine a transmit scheme according to an ordered manner. More specifically, the system is operable to determine a transmit scheme that defines a signaling configuration that includes number of spatial streams, antenna configuration information, code rate, quadrature modulation type, and transmission protocol modulation scheme, transmitting a packet according to the transmit scheme and collecting packet error rate success and failure information of ongoing data transmissions.

10 Claims, 22 Drawing Sheets wireless transmitter processor 150 transceiver 200

| MCS Index | Modulation | R | $N_{BPSC}$ | $N_{SD}$ | $N_{SP}$ | $N_{CBPS}$ | $N_{DBPS}$ | Data rate (Mbps) | |
|---|---|---|---|---|---|---|---|---|---|
| | | | | | | | | 800ns GI | 400ns GI[1] |
| 0 | BPSK | 1/2 | 1 | 52 | 4 | 52 | 26 | 6.5 | 7.2 |
| 1 | QPSK | 1/2 | 2 | 52 | 4 | 104 | 52 | 13.0 | 14.4 |
| 2 | QPSK | 3/4 | 2 | 52 | 4 | 104 | 78 | 19.5 | 21.7 |
| 3 | 16-QAM | 1/2 | 4 | 52 | 4 | 208 | 104 | 26.0 | 28.9 |
| 4 | 16-QAM | 3/4 | 4 | 52 | 4 | 208 | 156 | 39.0 | 43.3 |
| 5 | 64-QAM | 2/3 | 6 | 52 | 4 | 312 | 208 | 52.0 | 57.8 |
| 6 | 64-QAM | 3/4 | 6 | 52 | 4 | 312 | 234 | 58.5 | 65.0 |
| 7 | 64-QAM | 5/6 | 6 | 52 | 4 | 312 | 260 | 65.0 | 72.2 |

FIG. 6

| MCS Index | Modulation | R | $N_{BPSC}$ | $N_{SD}$ | $N_{SP}$ | $N_{CBPS}$ | $N_{DBPS}$ | Data rate (Mbps) | |
|---|---|---|---|---|---|---|---|---|---|
| | | | | | | | | 800ns GI | 400ns GI |
| 8 | BPSK | 1/2 | 1 | 52 | 4 | 104 | 52 | 13.0 | 14.444 |
| 9 | QPSK | 1/2 | 2 | 52 | 4 | 208 | 104 | 26.0 | 28.889 |
| 10 | QPSK | 3/4 | 2 | 52 | 4 | 208 | 156 | 39.0 | 43.333 |
| 11 | 16-QAM | 1/2 | 4 | 52 | 4 | 416 | 208 | 52.0 | 57.778 |
| 12 | 16-QAM | 3/4 | 4 | 52 | 4 | 416 | 312 | 78.0 | 86.667 |
| 13 | 64-QAM | 2/3 | 6 | 52 | 4 | 624 | 416 | 104.0 | 115.556 |
| 14 | 64-QAM | 3/4 | 6 | 52 | 4 | 624 | 468 | 117.0 | 130.000 |
| 15 | 64-QAM | 5/6 | 6 | 52 | 4 | 624 | 520 | 130.0 | 144.444 |

FIG. 7

TS Parameters Table 250

FIG. 15    TS control logic 270

TS and probe mapping tables

TX flow diagram

RX flow diagram

Table B: Probe Mapping Tables for OS-0

| V.I. \ O.S.I. | 0 | 1 |
|---|---|---|
| 7 | ✗ | 4 |
| 6 | ✗ | 4 |
| 5 | ✗ | 3 |
| 4 | ✗ | 2 |
| 3 | ✗ | 1 |
| 2 | ✗ | 1 |
| 1 | ✗ | 0 |
| 0 | ✗ | 0 | for OS-1

| V.I. \ O.S.I. | 0 | 1 |
|---|---|---|
| 7 | ✗ | ✗ |
| 6 | ✗ | ✗ |
| 5 | ✗ | ✗ |
| 4 | 7 | ✗ |
| 3 | 5 | ✗ |
| 2 | 4 | ✗ |
| 1 | 3 | ✗ |
| 0 | 1 | ✗ |

Table A: Joint View of OS Table and Probe Mapping Table for 40 MHz Mode of Operation

| V.I. | OS-1 MCS | OS-0 MCS | V.I. | Rate Mbps |
|---|---|---|---|---|
| 7 | MCS-15 | | | 270 |
| 6 | MCS-14 | | | 243 |
| 5 | MCS-13 | | | 216 |
| 4 | MCS-12 | | | 162 |
| | | MCS-7 | 7 | 135 |
| 3 | MCS-11 | MCS-6 | 6 | 121.5 |
| 2 | MCS-10 | MCS-5 | 5 | 108 |
| 1 | MCS-9 | MCS-4 | 4 | 81 |
| | | MCS-3 | 3 | 54 |
| 0 | MCS-8 | MCS-2 | 2 | 40.5 |
| | | MCS-1 | 1 | 27 |
| | | MCS-0 | 0 | 13.5 |

Legend:
V.I. = Vertical Index
MCS = Modulation and Coding Scheme
O.S.I. = OS Index
Vertical Arrows: Vertical TS Control
Horizontal / Diagonal Arrows: Probing ✗ = unused (no probing)

FIG. 19

Example 1: Spatial Stream Adaptation

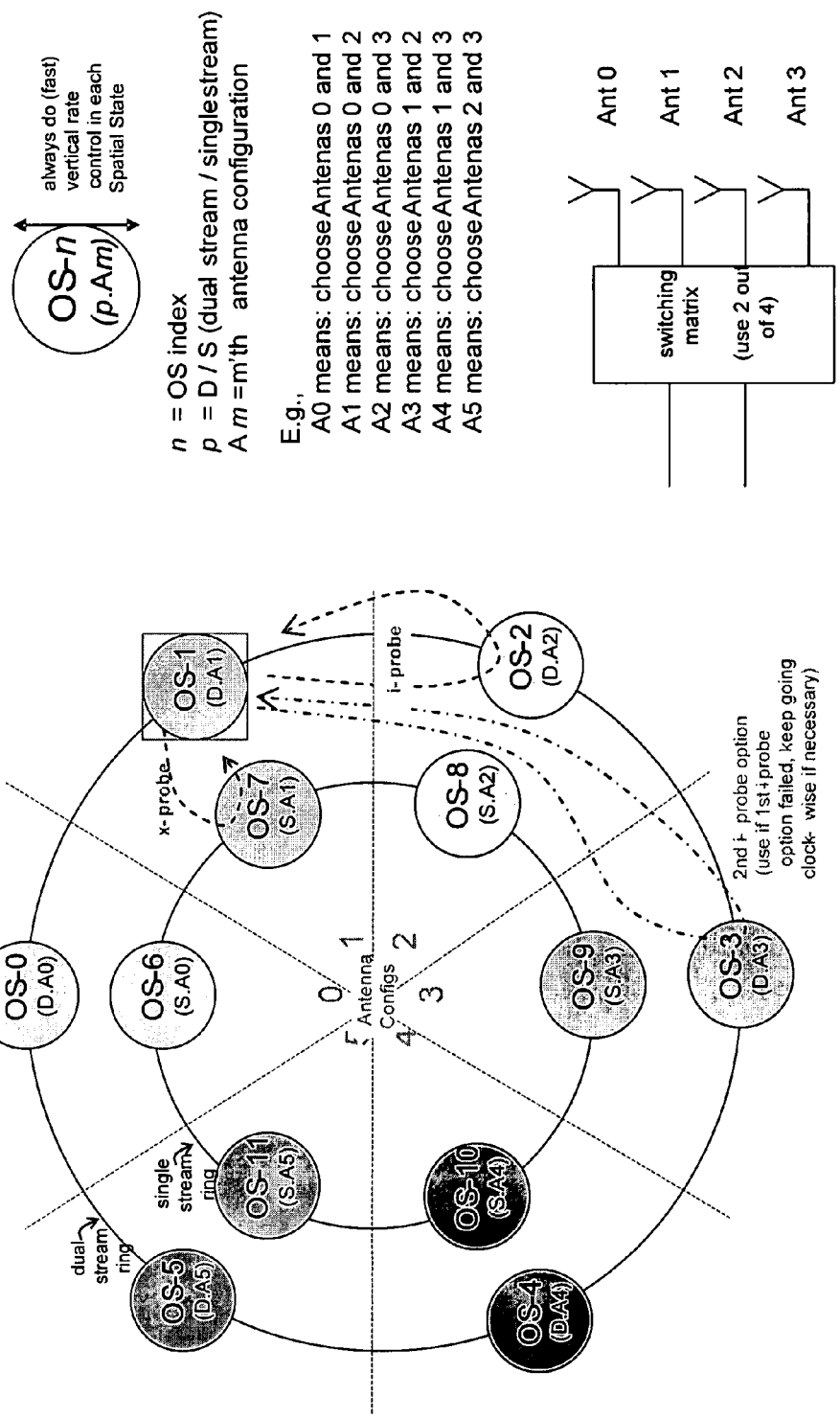

TRANSMIT SCHEME ADAPTATION FOR WIRELESS DATA TRANSMISSIONS

CROSS REFERENCE TO RELATED PATENTS

This U.S. application for patent claims the benefit of the filing date of U.S. Provisional Patent Application having Ser. No. 60/881,715, filed on Jan. 21, 2007, which is incorporated herein by reference for all purposes.

BACKGROUND

1. Technical Field

The present invention relates to wireless communications and, more particularly, to circuitry and logic for generating outgoing communication signals.

2. Related Art

Communication systems are known to support wireless and wire lined communications between wireless and/or wire lined communication devices. Such communication systems range from national and/or international cellular telephone systems to the Internet to point-to-point in-home wireless networks. Each type of communication system is constructed, and hence operates, in accordance with one or more communication standards. For instance, wireless communication systems may operate in accordance with one or more standards, including, but not limited to, IEEE 802.11, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), and/or variations thereof.

Depending on the type of wireless communication system, a wireless communication device, such as a cellular telephone, two-way radio, personal digital assistant (PDA), personal computer (PC), laptop computer, home entertainment equipment, etc., communicates directly or indirectly with other wireless communication devices. For direct communications (also known as point-to-point communications), the participating wireless communication devices tune their receivers and transmitters to the same channel or channels (e.g., one of a plurality of radio frequency (RF) carriers of the wireless communication system) and communicate over that channel(s). For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via a public switch telephone network (PSTN), via the Internet, and/or via some other wide area network.

Each wireless communication device includes a built-in radio transceiver (i.e., receiver and transmitter) or is coupled to an associated radio transceiver (e.g., a station for in-home and/or in-building wireless communication networks, RF modem, etc.). As is known, the transmitter includes a data modulation stage, one or more intermediate frequency stages, and a power amplifier stage. The data modulation stage converts raw data into baseband signals in accordance with the particular wireless communication standard. The one or more intermediate frequency stages mix the baseband signals with one or more local oscillations to produce RF signals. The power amplifier stage amplifies the RF signals prior to transmission via an antenna.

Typically, the data modulation stage is implemented on a baseband processor chip, while the intermediate frequency (IF) stages and power amplifier stage are implemented on a separate radio processor chip. Historically, radio integrated circuits have been designed using bi-polar circuitry, allowing for large signal swings and linear transmitter component behavior. Therefore, many legacy baseband processors employ analog interfaces that communicate analog signals to and from the radio processor.

In traditional transmission protocols, a plurality of transmit schemes may be defined that correspond to different transmission rates. A number of data rates for wireless orthogonal frequency division multiplex (OFDM) may be utilized based upon channel conditions. One problem, however, is that data robustness often decreases with increased data rates. Accordingly, a trade off exists between data rates and robustness. A need exists, therefore, for determining an appropriate data rate and associated transmit scheme for current channel conditions.

SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

BRIEF DESCRIPTION OF THE DRAWINGS

FIGS. 6 and 7 are tables that illustrate rate dependent transmit parameters for various operational transmit parameters according to a plurality of embodiments of the invention;

FIG. 19 shows a concrete example for a TS adaptation scheme in the context of the TS tables;

FIGS. 20 and 21 are diagrams that illustrate an extension of the TS Adaptation Scheme according to one embodiment of the invention.

DETAILED DESCRIPTION OF THE DRAWINGS

Figure 1:
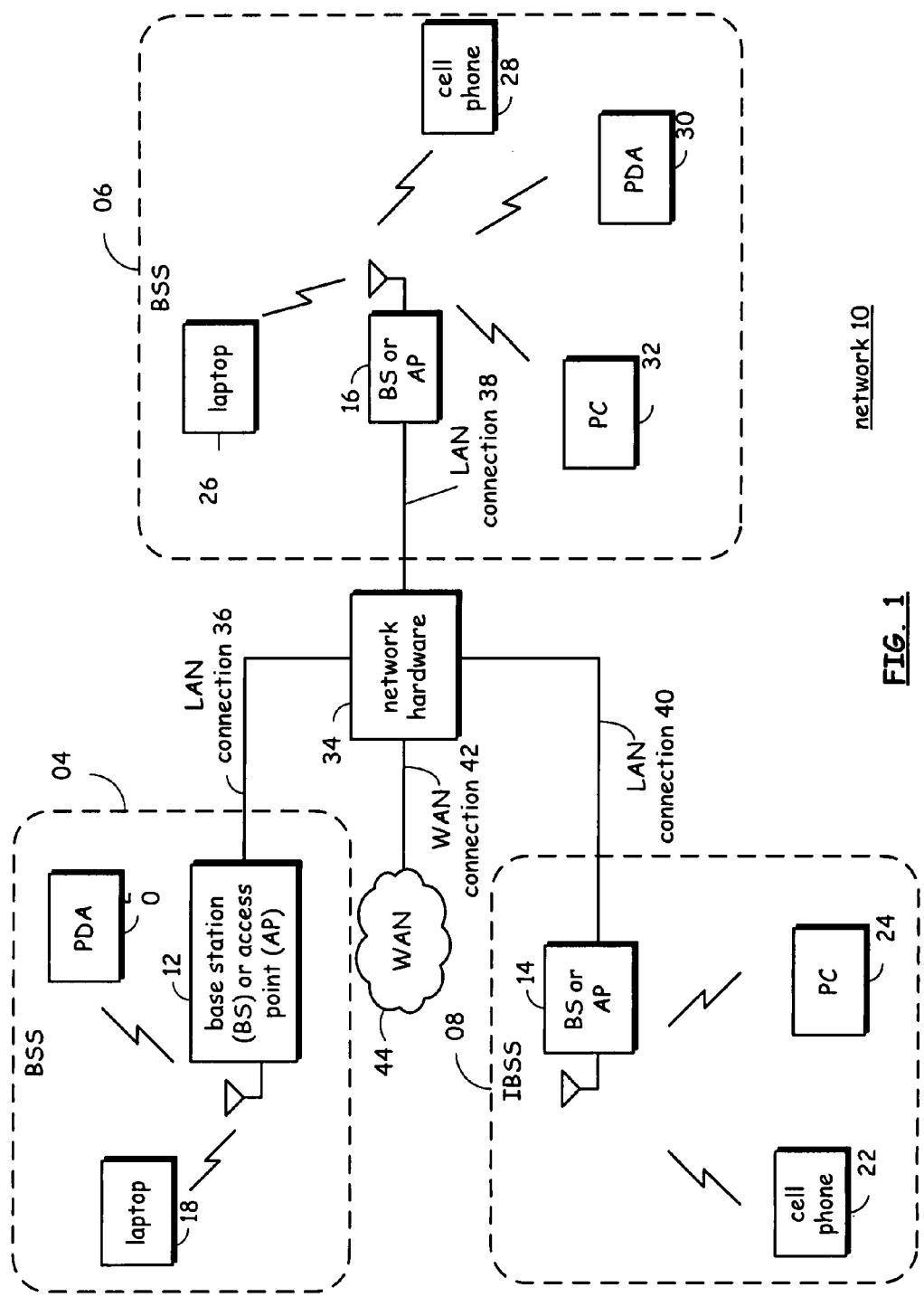
FIG. 1 is a functional block diagram illustrating a communication system that includes circuit devices and network elements and operation thereof according to one embodiment of the invention.

FIG. 1 is a functional block diagram illustrating a communication system that includes circuit devices and network elements and operation thereof according to one embodiment of the invention. More specifically, a plurality of network service areas 04, 06 and 08 are a part of a network 10. Network 10 includes a plurality of base stations or access points (APs) 12-16, a plurality of wireless communication devices 18-32 and a network hardware component 34. The wireless communication devices 18-32 may be laptop computers 18 and 26, personal digital assistants 20 and 30, personal computers 24 and 32 and/or cellular telephones 22 and 28. The details of the wireless communication devices will be described in greater detail with reference to Figures that follow.

The base stations or APs 12-16 are operably coupled to the network hardware component 34 via local area network (LAN) connections 36, 38 and 40. The network hardware component 34, which may be a router, switch, bridge, modem, system controller, etc., provides a wide area network (WAN) connection 42 for the communication system 10 to an external network element such as WAN 44. Each of the base stations or access points 12-16 has an associated antenna or antenna array to communicate with the wireless communication devices in its area. Typically, the wireless communication devices 18-32 register with the particular base station or access points 12-16 to receive services from the communication system 10. For direct connections (i.e., point-to-point communications), wireless communication devices communicate directly via an allocated channel.

Typically, base stations are used for cellular telephone systems and like-type systems, while access points are used for in-home or in-building wireless networks. Regardless of the particular type of communication system, each wireless communication device includes a built-in radio and/or is coupled to a radio. Generally, though, each transmitter is operable to interleave outgoing signals and to de-interleave ingoing signals according to the various embodiments of the invention.

Figure 2:
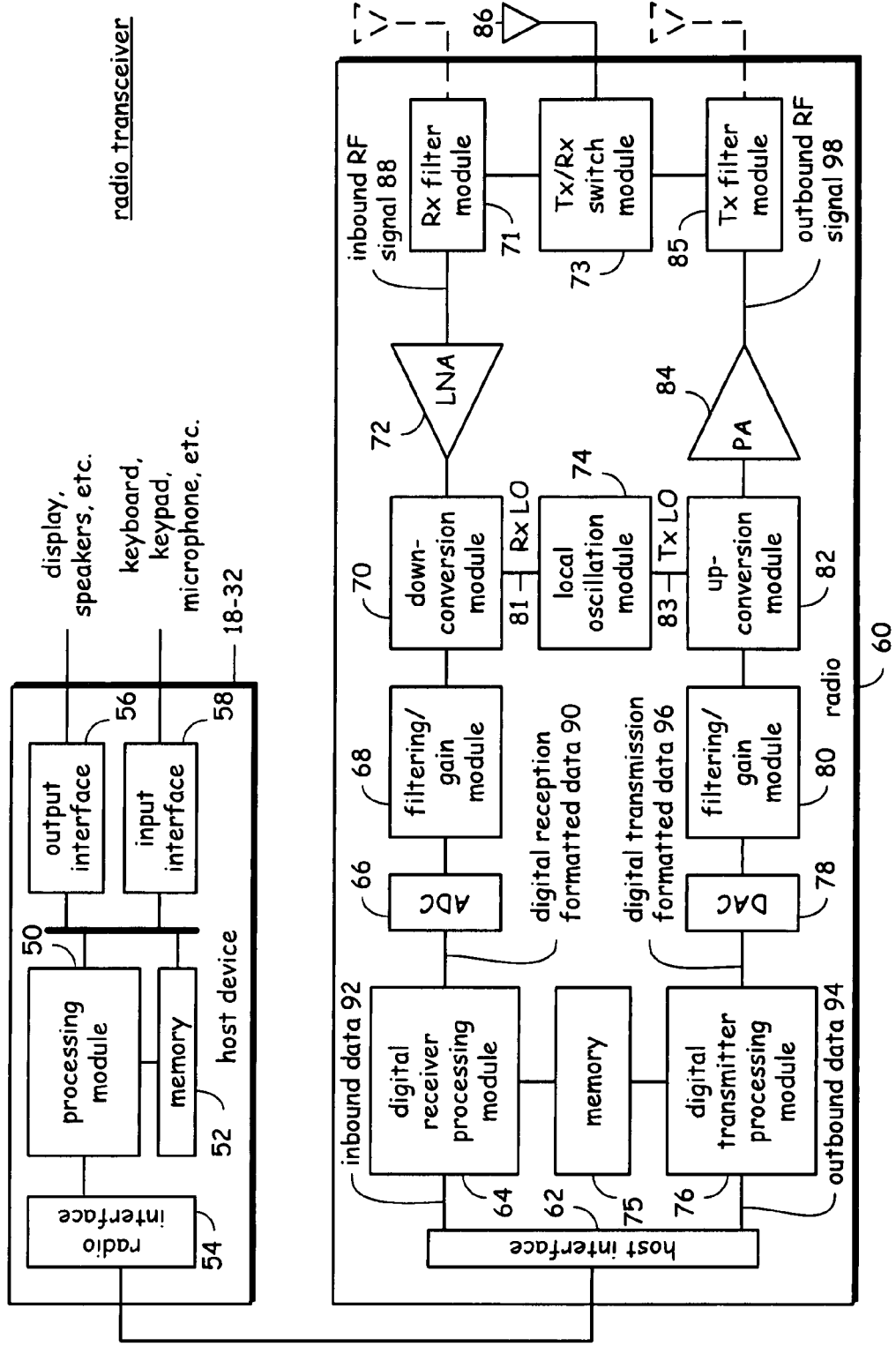
FIG. 2 is a schematic block diagram illustrating a wireless communication host device and an associated radio.

FIG. 2 is a schematic block diagram illustrating a wireless communication host device 18-32 and an associated radio 60. For cellular telephone hosts, radio 60 is a built-in component. For personal digital assistants hosts, laptop hosts, and/or personal computer hosts, the radio 60 may be built-in or an externally coupled component.

As illustrated, wireless communication host device 18-32 includes a processing module 50, a memory 52, a radio interface 54, an input interface 58 and an output interface 56. Processing module 50 and memory 52 execute the corresponding instructions that are typically done by the host device. For example, for a cellular telephone host device, processing module 50 performs the corresponding communication functions in accordance with a particular cellular telephone standard.

Radio interface 54 allows data to be received from and sent to radio 60. For data received from radio 60 (e.g., inbound data), radio interface 54 provides the data to processing module 50 for further processing and/or routing to output interface 56. Output interface 56 provides connectivity to an output device such as a display, monitor, speakers, etc., such that the received data may be displayed. Radio interface 54 also provides data from processing module 50 to radio 60. Processing module 50 may receive the outbound data from an input device such as a keyboard, keypad, microphone, etc., via input interface 58 or generate the data itself. For data received via input interface 58, processing module 50 may perform a corresponding host function on the data and/or route it to radio 60 via radio interface 54.

Radio 60 includes a host interface 62, a digital receiver processing module 64, an analog-to-digital converter 66, a filtering/gain module 68, a down-conversion module 70, a low noise amplifier 72, a receiver filter module 71, a transmitter/receiver (Tx/Rx) switch module 73, a local oscillation module 74, a memory 75, a digital transmitter processing module 76, a digital-to-analog converter 78, a filtering/gain module 80, an up-conversion module 82, a power amplifier 84, a transmitter filter module 85, and an antenna 86 operatively coupled as shown. The antenna 86 is shared by the transmit and receive paths as regulated by the Tx/Rx switch module 73. The antenna implementation will depend on the particular standard to which the wireless communication device is compliant.

Digital receiver processing module 64 and digital transmitter processing module 76, in combination with operational instructions stored in memory 75, execute digital receiver functions and digital transmitter functions, respectively. The digital receiver functions include, but are not limited to, demodulation, constellation demapping, decoding, and/or descrambling. The digital transmitter functions include, but are not limited to, scrambling, encoding, constellation mapping, and modulation. Digital receiver and transmitter processing modules 64 and 76, respectively, may be implemented using a shared processing device, individual processing devices, or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions.

Memory 75 may be a single memory device or a plurality of memory devices. Such a memory device may be a read-only memory, random access memory, volatile memory, non-volatile memory, static memory, dynamic memory, flash memory, and/or any device that stores digital information. Note that when digital receiver processing module 64 and/or digital transmitter processing module 76 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry. Memory 75 stores, and digital receiver processing module 64 and/or digital transmitter processing module 76 executes, operational instructions corresponding to at least some of the functions illustrated herein.

In operation, radio 60 receives outbound data 94 from wireless communication host device 18-32 via host interface 62. Host interface 62 routes outbound data 94 to digital transmitter processing module 76, which processes outbound data 94 in accordance with a particular wireless communication standard or protocol (e.g., IEEE 802.11(a), IEEE 802.9, Bluetooth, etc.) to produce digital transmission formatted data 96. Digital transmission formatted data 96 will be a digital baseband signal or a digital low IF signal, where the low IF typically will be in the frequency range of one hundred kilohertz to a few megahertz.

Digital-to-analog converter 78 converts digital transmission formatted data 96 from the digital domain to the analog domain. Filtering/gain module 80 filters and/or adjusts the gain of the analog baseband signal prior to providing it to up-conversion module 82. Up-conversion module 82 directly converts the analog baseband signal, or low IF signal, into an RF signal based on a transmitter local oscillation 83 provided by local oscillation module 74. Power amplifier 84 amplifies the RF signal to produce an outbound RF signal 98, which is filtered by transmitter filter module 85. The antenna 86 transmits outbound RF signal 98 to a targeted device such as a base station, an access point and/or another wireless communication device.

Radio 60 also receives an inbound RF signal 88 via antenna 86, which was transmitted by a base station, an access point, or another wireless communication device. The antenna 86 provides inbound RF signal 88 to receiver filter module 71 via Tx/Rx switch module 73, where Rx filter module 71 bandpass filters inbound RF signal 88. The Rx filter module 71 provides the filtered RF signal to low noise amplifier 72, which amplifies inbound RF signal 88 to produce an amplified inbound RF signal. Low noise amplifier 72 provides the amplified inbound RF signal to down-conversion module 70, which directly converts the amplified inbound RF signal into an inbound low IF signal or baseband signal based on a receiver local oscillation 81 provided by local oscillation module 74. Down-conversion module 70 provides the inbound low IF signal or baseband signal to filtering/gain module 68. Filtering/gain module 68 may be implemented in accordance with the teachings of the present invention to filter and/or attenuate the inbound low IF signal or the inbound baseband signal to produce a filtered inbound signal.

Analog-to-digital converter 66 converts the filtered inbound signal from the analog domain to the digital domain to produce digital reception formatted data 90. Digital receiver processing module 64 decodes, descrambles, demaps, and/or demodulates digital reception formatted data 90 to recapture inbound data 92 in accordance with the particular wireless communication standard being implemented by radio 60. Host interface 62 provides the recaptured inbound data 92 to the wireless communication host device 18-32 via radio interface 54.

Figure 10:
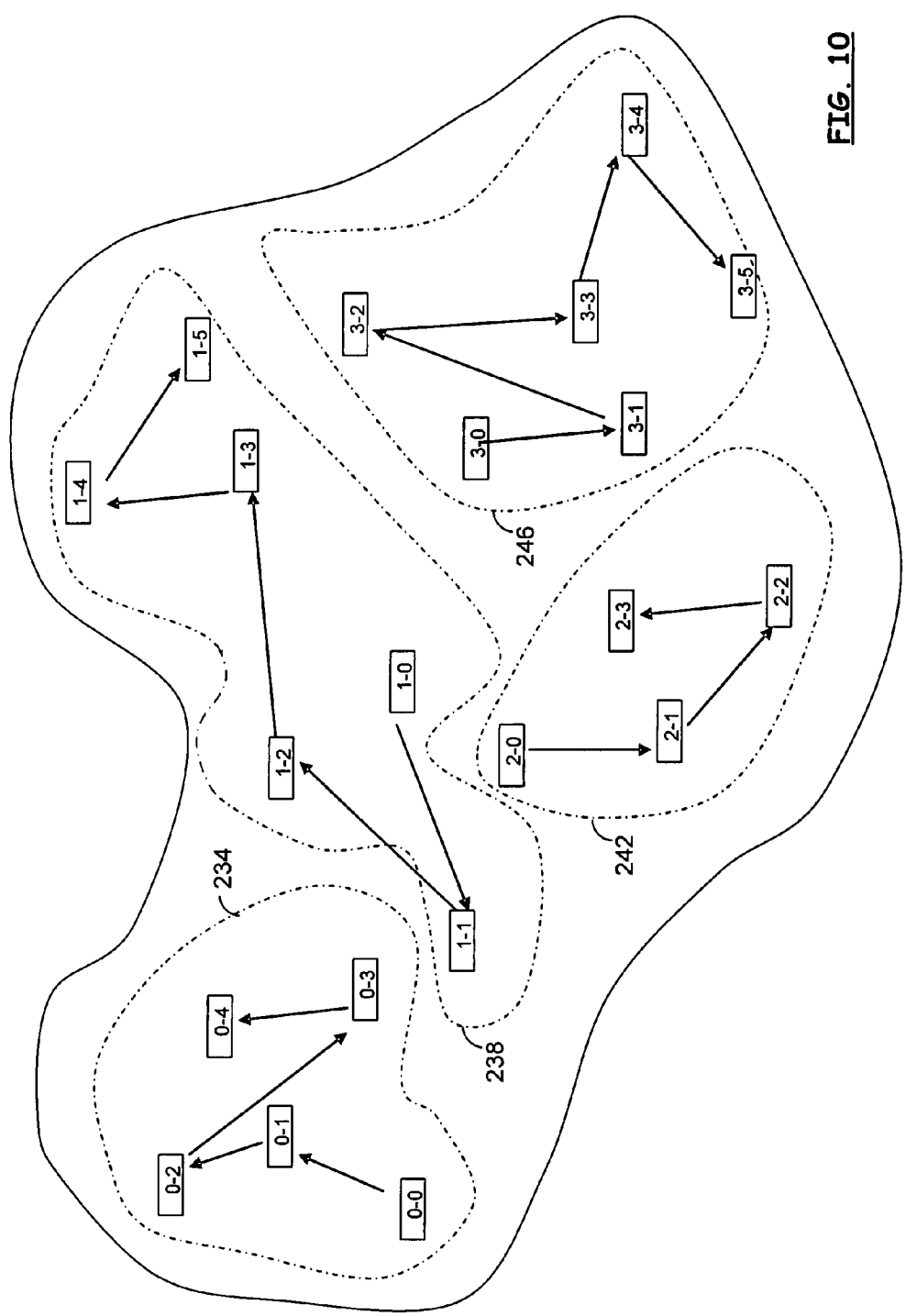
FIG. 10 is a diagram that illustrates how indices into the ordered sets (the OS index or "horizontal index") and vertical Indices within each OS can be used to point to a given TS.

As one of average skill in the art will appreciate, the wireless communication device of FIG. 10 may be implemented using one or more integrated circuits. For example, the host device may be implemented on a first integrated circuit, while digital receiver processing module 64, digital transmitter processing module 76 and memory 75 may be implemented on a second integrated circuit, and the remaining components of radio 60, less antenna 86, may be implemented on a third integrated circuit. As an alternate example, radio 60 may be implemented on a single integrated circuit. As yet another example, processing module 50 of the host device and digital receiver processing module 64 and digital transmitter processing module 76 may be a common processing device implemented on a single integrated circuit.

Memory 52 and memory 75 may be implemented on a single integrated circuit and/or on the same integrated circuit as the common processing modules of processing module 50, digital receiver processing module 64, and digital transmitter processing module 76. As will be described, it is important that accurate oscillation signals are provided to mixers and conversion modules. A source of oscillation error is noise coupled into oscillation circuitry through integrated circuitry biasing circuitry. One embodiment of the present invention reduces the noise by providing a selectable pole low pass filter in current mirror devices formed within the one or more integrated circuits.

Local oscillation module 74 includes circuitry for adjusting an output frequency of a local oscillation signal provided therefrom. Local oscillation module 74 receives a frequency correction input that it uses to adjust an output local oscillation signal to produce a frequency corrected local oscillation signal output. While local oscillation module 74, up-conversion module 82 and down-conversion module 70 are implemented to perform direct conversion between baseband and RF, it is understood that the principles herein may also be applied readily to systems that implement an intermediate frequency conversion step at a low intermediate frequency.

Figure 3:
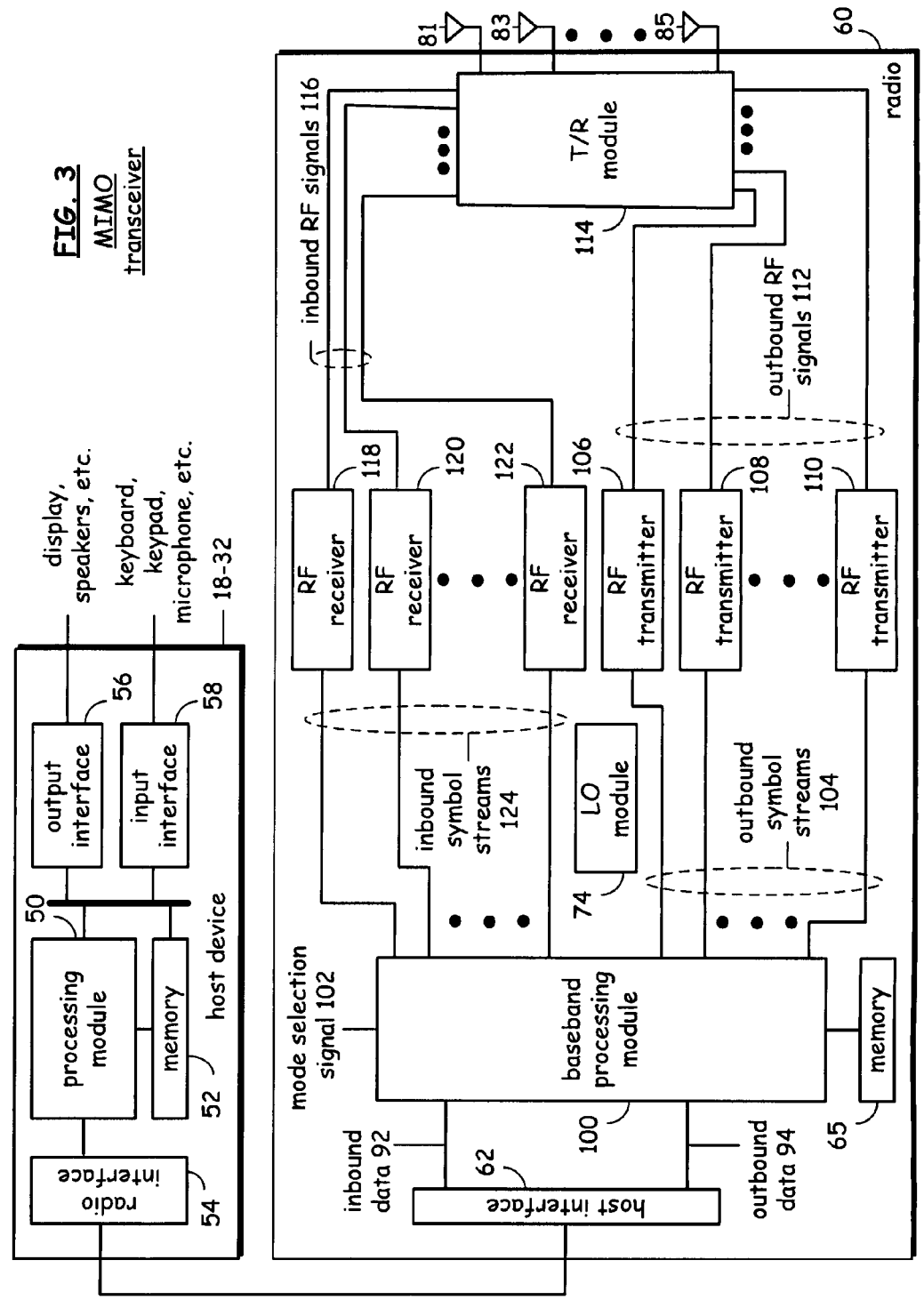
FIG. 3 is a schematic block diagram illustrating a wireless communication device that includes the host device and an associated radio.

FIG. 3 is a schematic block diagram illustrating a wireless communication device that includes the host device 18-32 and an associated radio 60. For cellular telephone hosts, the radio 60 is a built-in component. For personal digital assistants hosts, laptop hosts, and/or personal computer hosts, the radio 60 may be built-in or an externally coupled component.

As illustrated, the host device 18-32 includes a processing module 50, memory 52, radio interface 54, input interface 58 and output interface 56. The processing module 50 and memory 52 execute the corresponding instructions that are typically done by the host device. For example, for a cellular telephone host device, the processing module 50 performs the corresponding communication functions in accordance with a particular cellular telephone standard.

The radio interface 54 allows data to be received from and sent to the radio 60. For data received from the radio 60 (e.g., inbound data), the radio interface 54 provides the data to the processing module 50 for further processing and/or routing to the output interface 56. The output interface 56 provides connectivity to an output display device such as a display, monitor, speakers, etc., such that the received data may be displayed. The radio interface 54 also provides data from the processing module 50 to the radio 60. The processing module 50 may receive the outbound data from an input device such as a keyboard, keypad, microphone, etc., via the input interface 58 or generate the data itself. For data received via the input interface 58, the processing module 50 may perform a corresponding host function on the data and/or route it to the radio 60 via the radio interface 54.

Radio 60 includes a host interface 62, a baseband processing module 100, memory 65, a plurality of radio frequency (RF) transmitters 106-110, a transmit/receive (T/R) module 114, a plurality of antennas 81-85, a plurality of RF receivers 118-120, and a local oscillation module 74. The baseband processing module 100, in combination with operational instructions stored in memory 65, executes digital receiver functions and digital transmitter functions, respectively. The digital receiver functions include, but are not limited to, digital intermediate frequency to baseband conversion, demodulation, constellation demapping, decoding, de-interleaving, fast Fourier transform, cyclic prefix removal, space and time decoding, and/or descrambling. The digital transmitter functions include, but are not limited to, scrambling, encoding, interleaving, constellation mapping, modulation, inverse fast Fourier transform, cyclic prefix addition, space and time encoding, and digital baseband to IF conversion. The baseband processing module 100 may be implemented using one or more processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory 65 may be a single memory device or a plurality of memory devices. Such a memory device may be a read-only memory, random access memory, volatile memory, non-volatile memory, static memory, dynamic memory, flash memory, and/or any device that stores digital information. Note that when the baseband processing module 100 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

In operation, the radio 60 receives outbound data 94 from the host device via the host interface 62. The baseband processing module 100 receives the outbound data 94 and, based on a mode selection signal 102, produces one or more outbound symbol streams 104. The mode selection signal 102 will indicate a particular mode of operation that is compliant with one or more specific modes of the various IEEE 802.11 standards. For example, the mode selection signal 102 may indicate a frequency band of 2.4 GHz, a channel bandwidth of 20 or 22 MHz and a maximum bit rate of 54 megabits-per-second. In this general category, the mode selection signal will further indicate a particular rate ranging from 1 megabit-per-second to 54 megabits-per-second. In addition, the mode selection signal will indicate a particular type of modulation, which includes, but is not limited to, Barker Code Modulation, BPSK, QPSK, CCK, 16 QAM and/or 64 QAM. The mode selection signal 102 may also include a code rate, a number of coded bits per subcarrier (NBPSC), coded bits per OFDM symbol (NCBPS), and/or data bits per OFDM symbol (NDBPS). The mode selection signal 102 may also indicate a particular channelization for the corresponding mode that provides a channel number and corresponding center frequency. The mode selection signal 102 may further indicate a power spectral density mask value and a number of antennas to be initially used for a MIMO communication.

The baseband processing module 100, based on the mode selection signal 102 produces one or more outbound symbol streams 104 from the outbound data 94. For example, if the mode selection signal 102 indicates that a single transmit antenna is being utilized for the particular mode that has been selected, the baseband processing module 100 will produce a single outbound symbol stream 104. Alternatively, if the mode selection signal 102 indicates 2, 3 or 4 antennas, the baseband processing module 100 will produce 2, 3 or 4 outbound symbol streams 104 from the outbound data 94.

Depending on the number of outbound symbol streams 104 produced by the baseband processing module 100, a corresponding number of the RF transmitters 106-110 will be enabled to convert the outbound symbol streams 104 into outbound RF signals 112. In general, each of the RF transmitters 106-110 includes a digital filter and upsampling module, a digital-to-analog conversion module, an analog filter module, a frequency up conversion module, a power amplifier, and a radio frequency bandpass filter. The RF transmitters 106-110 provide the outbound RF signals 112 to the transmit/receive module 114, which provides each outbound RF signal to a corresponding antenna 81-85.

When the radio 60 is in the receive mode, the transmit/receive module 114 receives one or more inbound RF signals 116 via the antennas 81-85 and provides them to one or more RF receivers 118-122. The RF receiver 118-122 converts the inbound RF signals 116 into a corresponding number of inbound symbol streams 124. The number of inbound symbol streams 124 will correspond to the particular mode in which the data was received. The baseband processing module 100 converts the inbound symbol streams 124 into inbound data 92, which is provided to the host device 18-32 via the host interface 62.

As one of average skill in the art will appreciate, the wireless communication device of FIG. 3 may be implemented using one or more integrated circuits. For example, the host device may be implemented on a first integrated circuit, the baseband processing module 100 and memory 65 may be implemented on a second integrated circuit, and the remaining components of the radio 60, less the antennas 81-85, may be implemented on a third integrated circuit. As an alternate example, the radio 60 may be implemented on a single integrated circuit. As yet another example, the processing module 50 of the host device and the baseband processing module 100 may be a common processing device implemented on a single integrated circuit. Further, the memory 52 and memory 65 may be implemented on a single integrated circuit and/or on the same integrated circuit as the common processing modules of processing module 50 and the baseband processing module 100.

Interleaving and de-interleaving according to the various embodiments of the invention is performed, within the embodiments of FIGS. 2 and 3, by the transmitter and receiver processing modules 76 and 64, respectively, of FIG. 2 and by the baseband processing module 100 of FIG. 3. Generally, though, any logic or circuitry that performs interleaving for transmissions and de-interleaving for receiver operations may implement any of the described embodiments of the invention.

Figure 4:
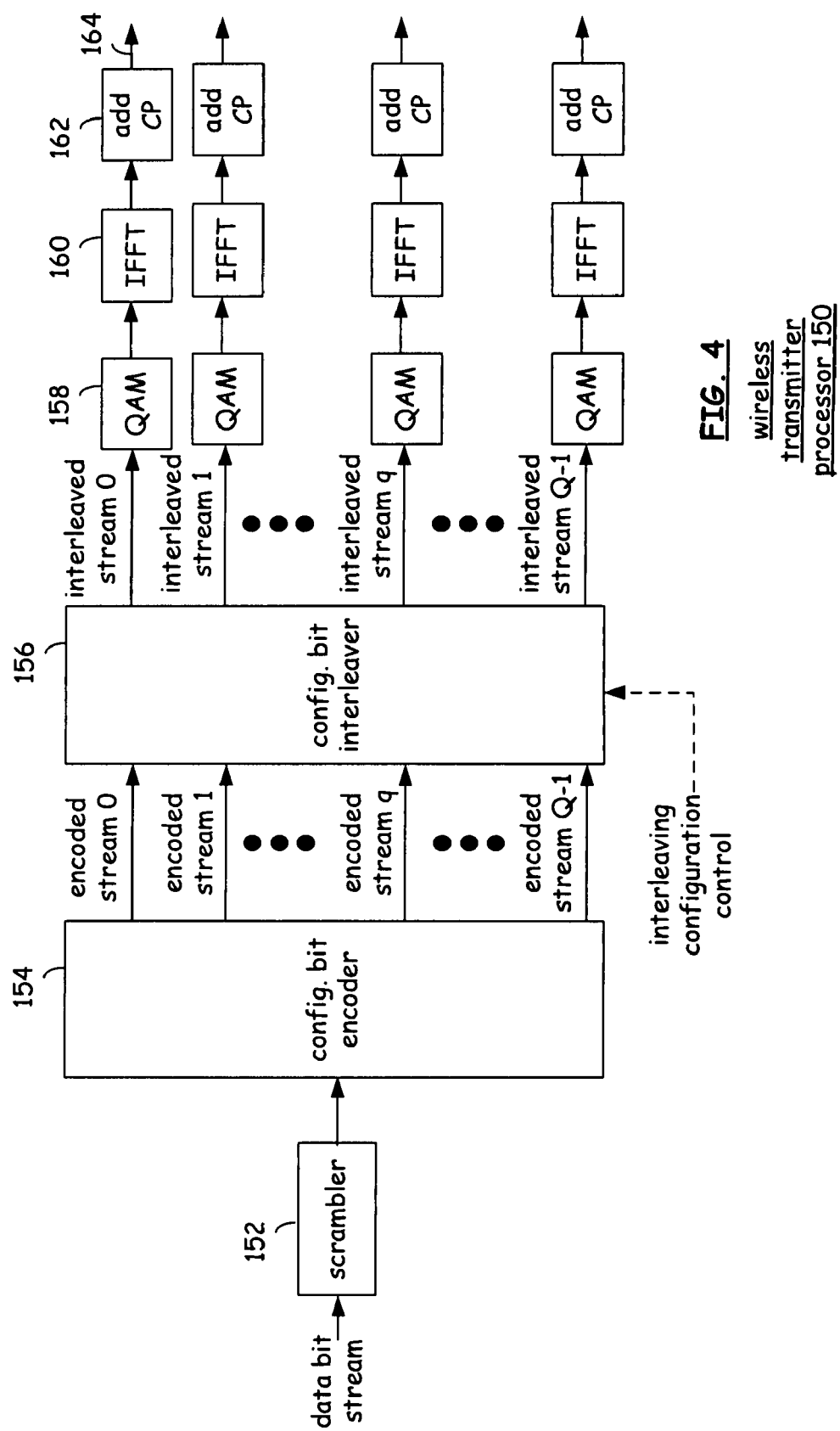
FIG. 4 is a functional block diagram of a wireless orthogonal frequency division multiplex (OFDM) transmitter processor that includes a multi-channel bit interleaver and other digital processing modules according to one embodiment of the invention.

FIG. 4 is a functional block diagram of a wireless orthogonal frequency division multiplex (OFDM) transmitter processor that includes a multi-channel bit interleaver and other digital processing modules according to one embodiment of the invention. Referring to processor 150 of FIG. 4, a data bit stream is produced to a scrambler 152 where the bits are scrambled according to a specified technique. Scrambler 152 then produces scrambled bits to a configurable bit encoder 154 that encodes the scrambled bits and produces a specified number of encoded data streams. As is known by one of average skill in the art, encoders provide protection for bits to allow a bit stream portion to be reconstructed by a receiver if interference destroyed some of the bits in the transmission path. Here, encoder 154 produces encoded bits streams 0, 1, ... q, ... Q−1. Generally, the number of encoded bit streams is a function of the transmitter and a transmission mode of operation (transmit scheme). For example, the number encoded bit streams for an OFDM transmitter is the same as the number of OFDM subcarriers used to simultaneously or nearly simultaneously transmit data by the OFDM transmitter.

Accordingly, encoder 154 produces Q−1 encoded streams for the Q−1 subcarriers being used by the OFDM transmitter to interleaver 156. Interleaver 156 produces an equivalent number (Q−1) interleaved bit streams. The Q−1 interleaved bit streams produced by interleaver 156 are interleaved according to the various embodiments of the invention as described herein.

Thus, each of the Q−1 interleaved bit streams produced by interleaver 156 are processed through traditional processor logic blocks in preparation for transmission from a radio front end (not shown in FIG. 4). For example, interleaved bit stream 0 is produced constellation encoding block 158 which performs specified quadrature amplitude modulation. Any known type of quadrature amplitude modulation may be used. In one embodiment, a traditional QPSK modulation is used. In another embodiment, 16-QAM modulation is used. Other types include, but are not limited to binary phase quadrature modulation (BPSK), 8-PSK, 64-QAM, 128-QAM, and 256-QAM. Constellation encoding is generally performed to increase data rates by generating data symbols that represent one of a plurality of data states.

Encoding block 158 then produces a modulation encoded signal to inverse Fast Fourier Transform (IFFT) block 160 which is operable to produce an inverse Fast Fourier Transform (IFFT) of the modulation encoded signal 160 to cyclic prefix block 162 which is operable to produce a guard interval for the signal prior to transmission from a radio front end.

The output of the signal with the cyclic prefix is shown at 164. The output at 164 is then produced to the radio front end that filters, amplifies and upconverts the outgoing signal to radio frequency prior to radiation from an antenna. Operation of each of the remaining branches for processing and transmitting the remaining Q−1 bit streams is the same as described for interleaved bit stream 0.

One aspect of the invention illustrated in FIG. 4 is that interleaver 156 is configurable to perform interleaving across the plurality of bit streams according the number of bit streams being generated for a multi-branch transmitter that is operable to transmit from a plurality of antennas using OFDM modulation. For example, merely because an OFDM transmitter having the circuitry to generate, for example, four OFDM outgoing signals, does not mean that the OFDM transmitter will always transmit over four streams at once. If, for example, a selected transmission mode requires transmission over only two channels, then Q−1 is equal to two. Accordingly, bit interleaver 156 receives only two encoded bit streams from encoder 154 and produces only two interleaved bits streams. Significantly, however, bits of each of the two bit streams are interleaved between the two streams in addition to being interleaved amongst the bits of each individual stream. Thus, interleaver 156 is configurable to utilize and includes logic configure the interleaving over a specified number of bit streams according to an interleaving configuration control signal.

Generally, the number of encoded streams received is not necessarily equal to the number of interleaved streams that are produced by configurable bit interleaver 156. Further, the number of input and/or output streams may readily be modified based upon modes of transmission. FIG. 4 thus illustrates digital processing blocks that are modifiable according to transmission mode, rate, etc., according to a specified transmit scheme. For example, the number of streams, the type of modulation, and the bit rate may all be modified in the configuration of FIG. 4 according to transmit scheme.

Figure 5:
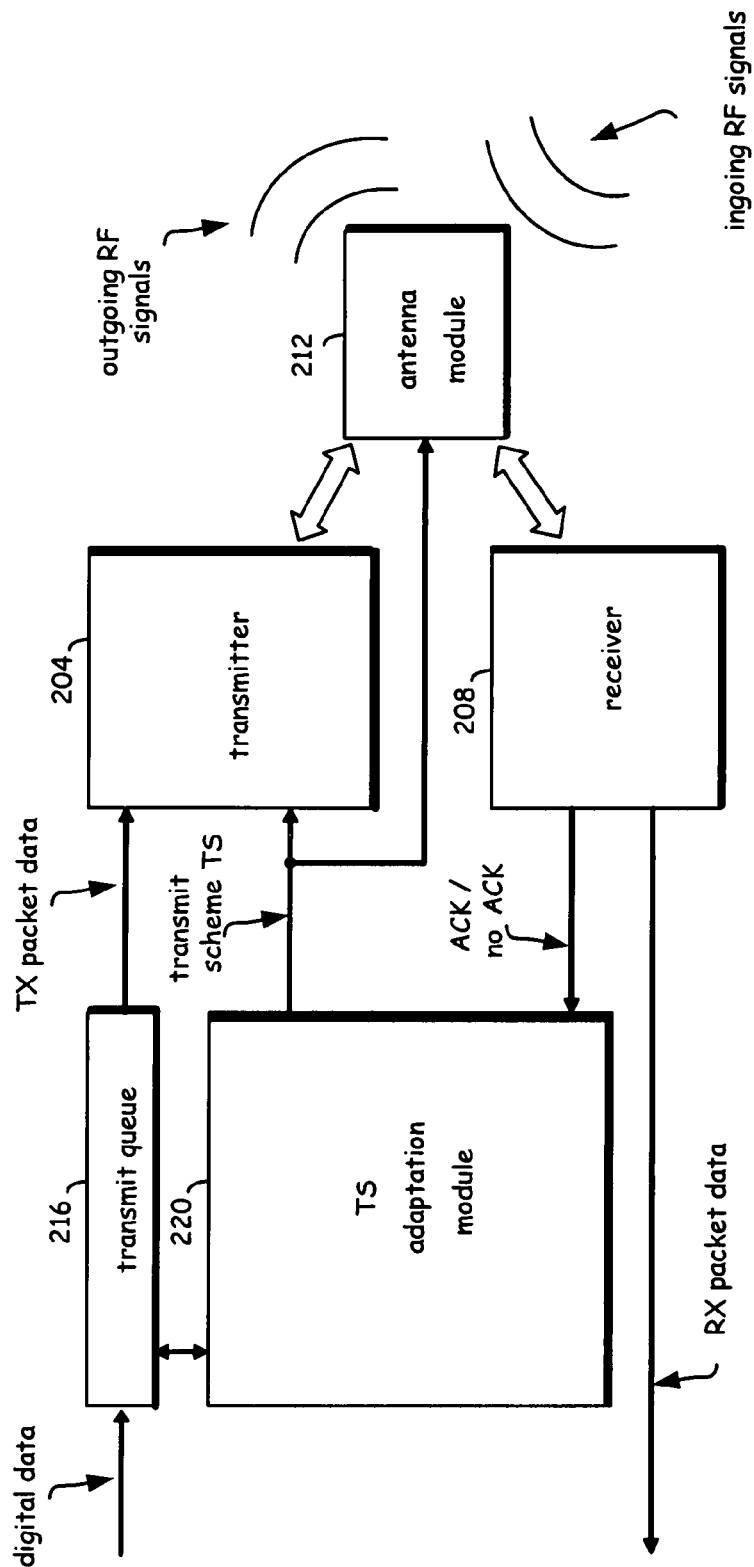
FIG. 5 is a functional block diagram of a wireless transceiver with transmitter and receiver modules and a unified transmit scheme adaptation module according to one embodiment of the invention.

FIG. 5 is a functional block diagram of a wireless transceiver with transmitter and receiver modules and a unified transmit scheme adaptation module according to one embodiment of the invention. A transmit scheme (TS) as referenced herein refers to the transmit parameters at the physical layer (PHY) that are used for an outgoing packet, i.e., packet transmitted in the air by the transmitter module of the modem. Traditional TS specification typically comprises transmit parameters such as the code-rate (e.g., ¾ in convolutional encoding), the modulation type (for example, type of quadrature amplitude modulation such as 16-QAM), or the underlying modulation scheme such as Direct Sequence Spread Spectrum (DSSS), Code-Division Multiple-Access (CDMA) or Orthogonal Frequency-Division Multiplexing (OFDM), the number of spatial streams that are to be used for a transmission, and antenna configuration information (e.g., selection of one or more specific antennas out of 2 or more antennas). The TS specification oftentimes goes hand in hand with the PHY transmission "rate" in Mbps. Herein, transmit parameters such as the code-rate or the modulation scheme, i.e., configurations will be referred to as "TS Settings" or "TS transmit parameters". These TS Settings will govern how a certain data packet (a number of information bits/bytes) is represented on "the air" of the wireless link.

For instance, in the OFDM-based WLAN standard 802.11a, there are eight different TS's or rates, namely 6, 9, 12, 18, 24, 36, 48, and 54 Mbps, each of which have underlying convolutional code-rates and QAM schemes leading to different spectral efficiencies, i.e., effectively transmission rates per given unit time interval. Also, these different TS's will exhibit varying degrees of robustness with regard to the wireless propagation channel, where the signal is exposed to multi-path propagation, as well as thermal receiver noise as well as other known sources of interference or causes of signal degradation. Transmitter distortion in the power amplifier and oscillator phase noise in the transmit or receive side of a wireless link that cause a jittering or smearing of the whole signal spectrum also affect signal quality. In many practical scenarios, a higher PHY rate (here, increasing from 6 to 54 Mbps) results in reduced robustness which means increased sensitivity to channel impairments or factors that degrade signal quality. There often exists, therefore, an inverse proportionality between the achievable PHY rate and the corresponding robustness and signal quality.

One aspect of the embodiments of the invention, therefore, is to determine optimal or best TS settings for a given propagation channel given current channel aspects that degrade signal quality under a given Optimization Criterion or Optimization Metric. For instance, the Optimization Criterion for TS Adaptation typically attempt to obtain a maximum PHY rate in Mbps under while maintaining an acceptable packets loss rate or packet error rate (PER). For example, a typical PER or bit error rate (BER) is desirably defined to remain below a certain percentage level.

Another exemplary optimization criterion can be to achieve maximum throughput. In this approach, the system may try for a TS representing a higher PHY rate than in the previous approach at the expense of a higher PER, provided that this TS choice leads to a higher throughput. Here, a TS scheme is selected that, with a given error correction scheme, provides the highest throughput of recoverable data.

In the above IEEE 802.11a scenario, TS Adaptation or rate Adaptation/Control refers to finding an optimal or preferred TS setting (6 to 54 Mbps) under the chosen criteria. Due to the mentioned inverse proportionality of rate vs robustness, it is often sufficient to reduce the rate, i.e., "go down" on the "Ordered Set" (OS) of rates $\{6, 12, \ldots 54\text{ Mbps}\}$, if a certain rate causes too many packet losses (i.e., below the specified PER). Conversely, if a certain rate in the rate-set leads to very robust transmissions, the rate can be stepped up by picking the next element from the ordered set of rates (of TS's). In the sequel, this kind of rate control is referred to as "vertical rate Control", or "vertical TS Adaptation", relating to the trend to have inverse proportionality between rate and robustness and the fact that the rate is increased/decreased in an ordered fashion between adjacent elements in the OS of Transmit Schemes.

More recent examples for TS's are the so-called "Modulation and Coding Schemes" (MCS) in the MIMO-OFDM standard for Wireless LANs, IEEE 802.11n. In addition to the above-mentioned convolution codes and the QAM modulation scheme, MCS's also contain the number of "spatial streams" as one TS parameter, i.e., the number of signals simultaneously transmitted in the same physical spectrum, but from different spatial locations such as distinct antennas.

Referring to FIG. 5, again, transceiver 200 thus includes a transmitter 204 and a receiver 208 that are operably disposed to transmit and receive through an antenna module 212. In one embodiment, antenna module 212 includes a transmit-receive switch module and at least one antenna for radiating and receiving electromagnetic RF signals propagated wirelessly. In one particular embodiment, transmit-receive module 212 includes switching logic that allows the module to be formed on-chip.

Transmitter 204 is operably disposed to receive TX packet data from a transmit queue 216 for transmission. Transmitter 204 is further operably disposed to receive transmit scheme TS transmit parameters from a TS adaptation module 220. TS adaptation module is operable to determine a transmit scheme TS based upon a plurality of quality criteria including the PER described above. Generally, in one embodiment, antenna module 212 transmits a data packet to a remote transceiver and subsequently receives either an ACK or a no ACK to indicate whether the packet was received successfully. In the described embodiment, TS adaptation module 220 is operably disposed to receive an ACK/no ACK indication from receiver 208 (which receives the ACK/no ACK by way of antenna module 212) which was transmitted by the remote transceiver. Thus, TS adaptation module 220 is operable to determine the PER based upon the ACK/no ACK indications received for each packet. It should be understood that other feedback forms may readily be implemented including bit error rate indications, frame quality indications, or even signal-to-noise ratios, which are estimated at the receiving end of the wireless link and sent back to the wireless transceiver 200 shown in FIG. 5. In one embodiment of the invention, the received ACK/no ACK may also include quality indications such as wireless propagation channel characteristics. In another embodiment, the quality indication is sent in a specialized signal (packet or frame). In general, however, TS adaptation module 220 determines the transmit scheme TS based upon the feedback including at least one of the ACK/no ACK signals, or a specified signal quality indication such as the PER, BER, FER (frame error rate), signal-to-noise ratio, etc.

FIGS. 6 and 7 are tables that illustrate rate dependent transmit parameters for various operational transmit parameters according to a plurality of embodiments of the invention. Generally, FIGS. 6 and 7 show an overview of the transmit parameters such as modulation and coding schemes used in Draft 1.0 of IEEE 802.11(n). MCS-0 through MCS-7 (FIG. 6) and MCS-8 through MCS-15 (FIG. 7). MCS-0 through 7 are so-called single-stream rates (single-stream TS's), which means that a single distinct signal is transmitted on the air, while MCS-8 through MCS-15 are dual-stream rates, where two signals are transmitted simultaneously. The single-stream MCS's form one Ordered Set, and the dual-stream rates form another Ordered set in the above introduced nomenclature. Draft 2.0 of IEEE 802.11(n) also contains three-stream and four-stream MCS rates, not shown in FIGS. 6 and 7.

Transmitting multiple signals simultaneously using multiple spatial streams (Multiple-Input-Multiple-Output, or MIMO, communication) allows a transmitter to essentially multiply the transmission rate, but it may come at the expense of reduced robustness of the transmission. This is due to the fact that the various streams transmitted on the air are superimposed in the channel and need to be untangled on the receive side. Depending on the actual channel conditions and the receive architecture. This process may introduce losses in transmission reliability compared to traditional single stream transmissions. However, if in conjunction with multi-stream signaling, other TS transmit parameters, such as code-rate and modulation, are changed to be more robust while also leading to a smaller rate per stream, the overall rate added across the multiple streams can still be higher than a single-stream transmission in the same channel condition.

Therefore, in contrast to the inverse proportionality in "vertical TS Adaptation" mentioned above, it is not always immediately obvious whether using more or less spatial streams will lead to an increase or decrease in robustness of the end-to-end link. Counter-intuitively, increasing a number of streams does not necessarily increase robustness and or the data rate. For example, resulting channel inefficiencies may result in an overall reduced data rate. Assuming, however, that a decision has been made to use dual-stream transmissions, there will be certain TS transmit parameters, such as modulation and/or coding schemes, whose variation will typically lead to increased or decreased robustness along with decreased or increased transmission rate, respectively. That is, given the dual-stream property, one can again define an "Ordered Set" of TS's that will tend to exhibit a monotonicity between robustness and rate.

A method is therefore provided for a TS Adaptation approach that is operable to seamlessly perform adaptation of TS transmit parameters for adjustment of rates within a given OS, as well as switching between OS's. The definition of the contents of OS's and the mentioned fundamental properties of vertical TS Adaptation for a given OS are part of various embodiments of the invention.

Antenna configuration is another transmitter setting that may operably be adjusted or controlled as a part of a TS. For instance, in traditional single-stream systems, the transmitter may nevertheless exhibit multiple antennas, one of which is chosen as the "best" for the transmission of a given packet. Again, the term "best antenna" depends on the optimization criterion such as maximum throughput or maximum rate under certain constraints, as outlined above.

For a multi-stream (MIMO) system, antenna configuration can also be modified. For instance, in a dual-stream MCS to be transmitted from two antennas, there may be a possibility to select two active antennas from number of antennas larger than 2. Again, the selection of the antenna configuration used for the desired transmission may depend on certain optimization criteria. Accordingly, a number of antennas used for single stream and multiple stream transmissions may be selected according to a specified TS. Adapting the antenna configuration as part of a unified TS Adaptation scheme is included, i.e., which antennas are selected, in various embodiments of the described invention.

In the TS Adaptation of the described embodiment, it is assumed that the transmitter feeds back Success/Failure information on the previous transmitted packet. For instance, in IEEE 802.11 WLAN, a successful transmission is confirmed by the receive side of the wireless link by a so-called Acknowledgment packet (ACK). If no ACK is obtained back, this typically means that the other end of the link was not able to receive or successfully decode the packet transmission. One reason for such a failed transmission could be a too aggressive or inappropriate selection of the TS by the transmitter. For instance, if the recipient is far away but the transmitter tries to use a high-rate TS that tends to be supported for close-by receivers, the signal-to-noise ratio on the receive side may be low, and the receiver will have difficulty reconstructing the packet information. It will not send back an ACK packet, or will send back an ACK packet specifying which information (sub-packet or sub-frame) in the previous transmission was successful, and which sub-frames were not successful. This information is used by the transmitter to make modifications to the TS used for subsequent following certain mechanisms, as outlined in subsequent paragraphs. Additional side information about the channel state or condition may be available and used for decision-making on the use of an appropriate TS at the transmitter in more advanced systems.

The columns in FIGS. 6 and 7 have the following meaning, based on IEEE 802.11n standardization: The "MCS Index" is a simple shortcut to refer to the transmit scheme that is listed in the corresponding row. Single-stream transmit schemes are numbered 0 through 7, and dual-stream transmits schemes are numbered 8 through 15. IEEE 802.11n also comprises 3-stream MCS's and 4-stream MCS's, with MCS indices 16 through 23 and 24 through 31, respectively (not shown). The column "Modulation" is the first column providing details of each MCS transmit scheme. "Modulation" refers to all types of modulation schemes including Quadrature Amplitude Modulation (QAM) schemes that may be utilized in each MCS. For example, the modulation may be one of Binary Phase Shift Keying (BPSK, containing 1 bit of information), Quadrature Phase Shift Keying (QPSK, 2 bits of information), 16-QAM (16-point constellation, 4 bits of information) and 64-QAM (64-point rectangular constellation, 6 bits of information).

The second column, "Rate" describes the code-rate of the convolution channel code used to protect the information bits; it is essentially the ratio between the number of information bits over the number of coded bits used for the actual transmission. The number of bits in the QAM constellation (Modulation scheme) is also shown in the column "N_BPSC", number of bits per subcarrier. Therefore, this column and the Modulation column are redundant. Columns N_SD and N_SP refer to the number of data subcarriers and pilot subcarriers in 802.11n's OFDM modulation. 802.11n specifies two bandwidth modes, 20 MHz and 40 MHz channel bandwidth.

FIGS. 6 and 7 refer to the 20 MHz bandwidth mode, where the number of data-carrying OFDM subcarriers is 52 for all MCS's. Column "N_CBPS", number of coded bits per OFDM symbol is simply the number of data subcarriers (N_SD) times the number of bits in the QAM constellation per subcarrier (N_BPSC). It describes the total number of coded bits in a 4 microseconds long OFDM symbol. Column "N_DBPS", number of data (or information) bits per OFDM symbol, is given by N_DBPS times the code rate. The final two columns contain the effective data rate that can be achieved using the given MCS. They distinguish between two cases for the so-called Guard Interval (GI). The GI, sometimes also referred to as Cyclic Prefix (CP, see also FIG. 4), is a time-interval protecting the transmission against propagation delay spread in the channel; it extends each 3.2 microseconds OFDM symbol interval to 4 microseconds or 3.6 microseconds, depending on whether an 800 ns CP or a 400 ns CP is used.

Figure 8:
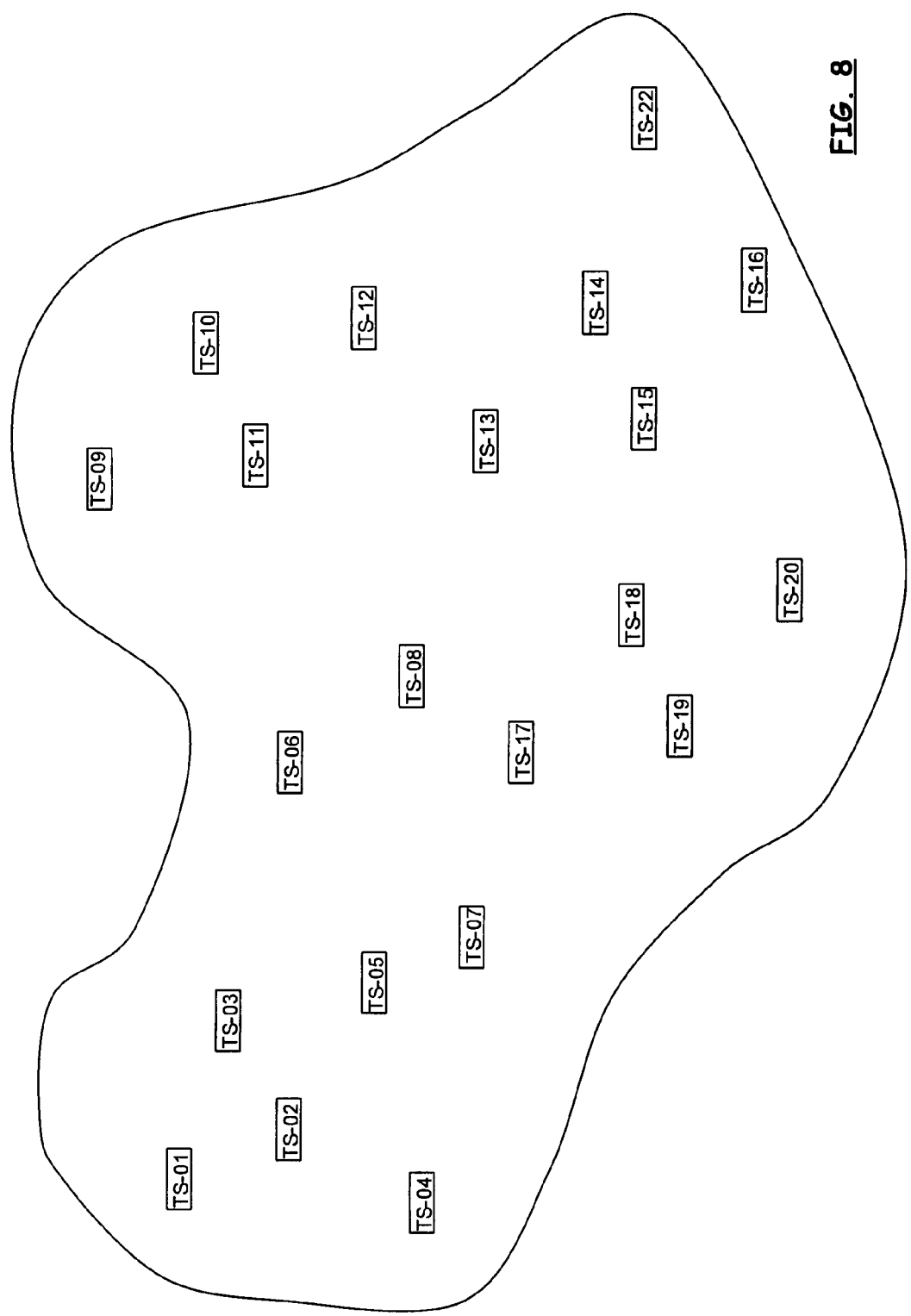
FIG. 8 is a diagram that shows a superset of all available transmit schemes that are available for selection by a given transmitter.

FIG. 8 is a diagram that shows a superset of all available transmit schemes that are available for selection by a given transmitter. Specifically, a transmitter is operable to transmit using one of the many transmit schemes shown. Each shown represents a specific TS being used for transmissions and the relative relationship or order in which transmit schemes are modified or selected. Each TS is characterized by specific settings of all relevant TS transmit parameters, such as Configuration, Spatial Stream Mode, Coding Scheme, Modulation Scheme, Antenna Configuration, etc. The objective of the overall TS Adaptation process is to find, ideally, the one TS out of all TS's that supports the best transmission for the given channel scenario at all times to a specified MS. Since an exhaustive search over all TS's is oftentimes prohibitive, too slow, or inefficient, especially in the context of a time-variant propagation channel, the approach shown in FIGS. 9 to 13 is used.

Generally, the transmit parameters of the transmit schemes have parameter settings that specifically identify a transmit parameter. For example, a number of spatial streams can range from 1 to 100, the code rate (in one embodiment) is one of 1/2, 2/3, 3/4 or 5/6, the modulation type is one of BPSK, QPSK, 8-PSK, 16-QAM, 32-QAM, 64-QAM, 128-QAM or 256-QAM, the antenna configuration includes at least one selected antenna of a plurality of antennas, and wherein the OFDM guard interval length is in the range of 50 nanoseconds to 2 micro-seconds.

Figure 9:
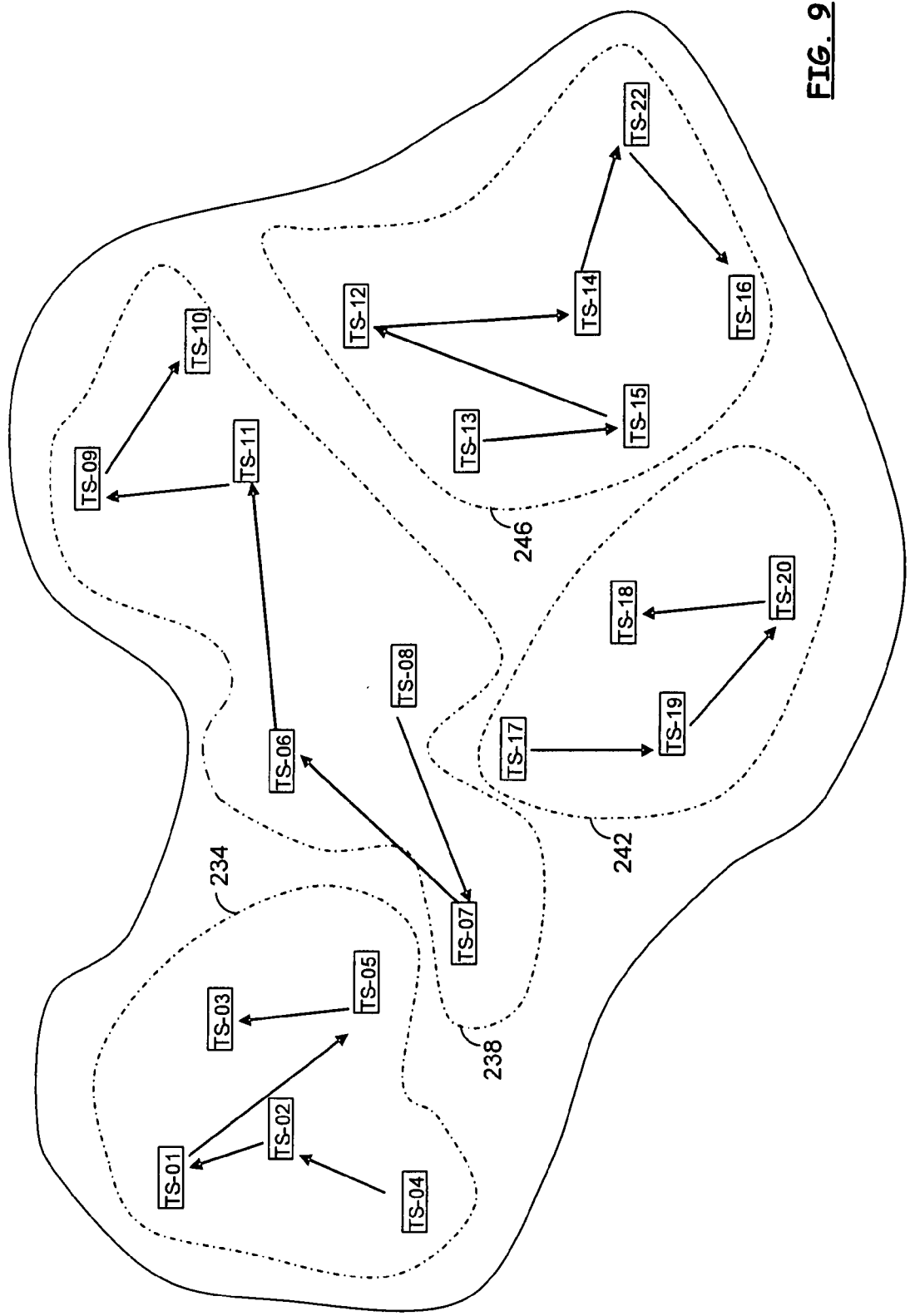
FIG. 9 is a diagram that illustrates division of the superset of all transmit schemes into ordered sets.

FIG. 9 is a diagram that illustrates division of the superset of all transmit schemes into ordered sets. Within each Ordered Set 234, 238, 242, and 246, the TS's are given a specific order, illustrated by the bolded arrows wherein the direction indicates sequentially increasing TS's. This order typically represents an increase in rate and, as described above, achieve an expected decrease in robustness. Thus, FIG. 9 illustrates a process of defining Ordered Sets 234-246 wherein a specified transmitter uses for modifying the TS in a specified manner/order.

FIG. 10 is a diagram that illustrates how indices into the ordered sets (the OS index or "horizontal index") and vertical Indices within each OS can be used to point to a given TS. This embodiment illustrates a method of addressing/indexing a given TS from the overall superset of TS's shown in FIG. 9. More specifically, each TS is shown with the notation "n-m" within the boxes of FIG. 10. The left hand digit "n" represents an Ordered Set index value while the right hand digit "m" represents the "vertical" index value. Thus, for example, the transmit schemes of Ordered Set 234 all are characterized by the Ordered Set index value of "0" and the vertical index values ranging from 0 to 4. Similarly, the transmit schemes for Ordered Set 238 all are characterized by the Ordered Set index value of "1" and the vertical index values ranging from 0 to 5. The transmit schemes for Ordered Set 242 all are characterized by the Ordered Set index value of "2" and the vertical index values ranging from 0 to 3. Finally, the transmit schemes for Ordered Set 246 all are characterized by the Ordered Set index value of "3" and the vertical index values ranging from 0 to 5.

Figure 11:
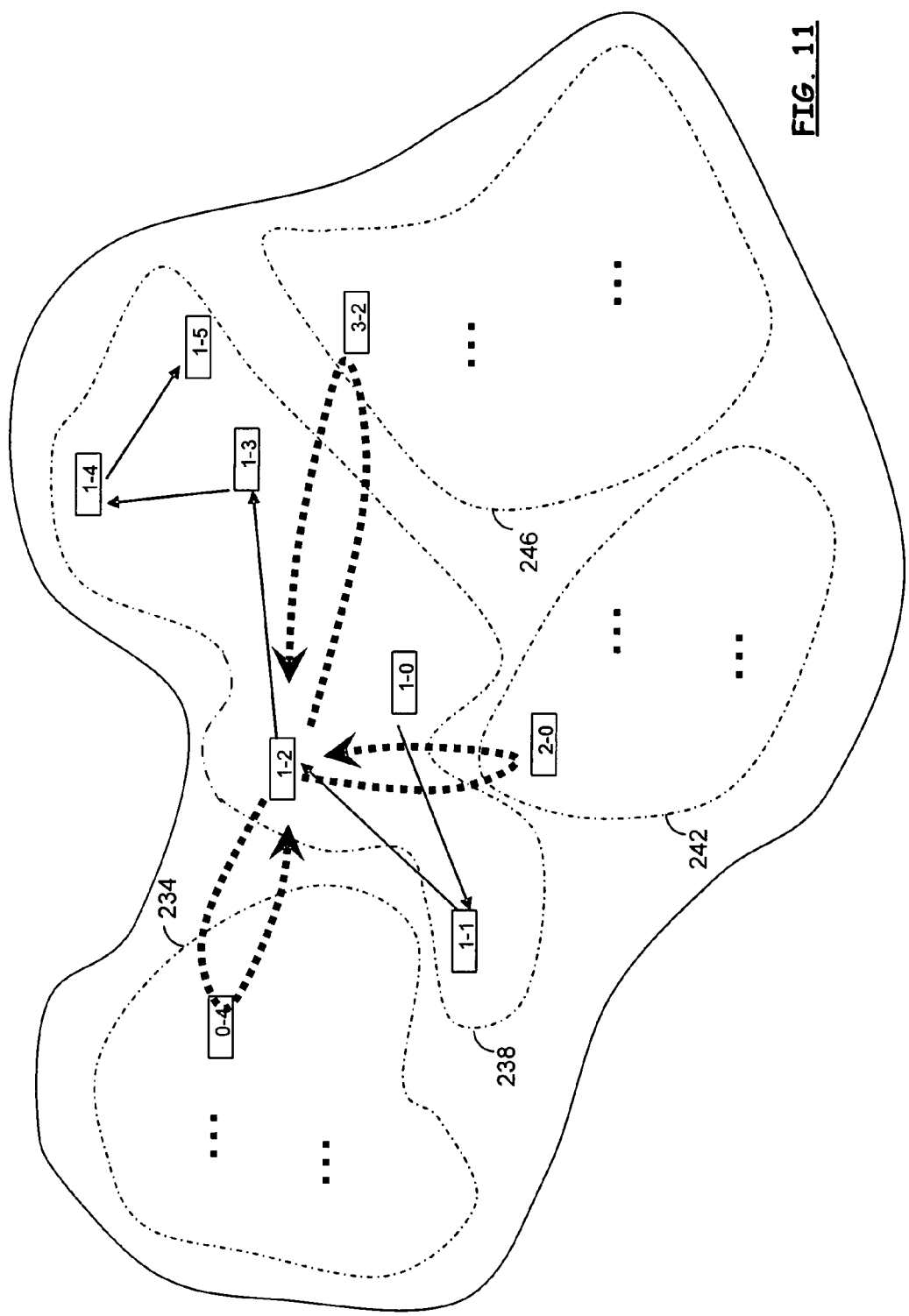
FIG. 11 is a diagram that illustrates vertical control according to one embodiment of the invention, in which also OS Probing (horizontal Probing) takes place in addition to the vertical Control illustrated in prior embodiments.

FIG. 11 is a diagram that illustrates vertical control according to one embodiment of the invention, in which also OS Probing (horizontal Probing) takes place in addition to the vertical control illustrated in prior embodiments. Vertical control relates to an adaptation of the TS along the arrows (ordered sequence) within an OS as shown in FIG. 10, for example. An update (change) or the TS occurs one step at a time in the upward direction (pointing direction of the arrows) or downward direction (against the pointing direction of the arrows) to quickly adjust the Transmitter to changing channel conditions. The dashed, bold, curve-linear arrows indicate probes into other OS's. While on average, for a given OS, most packets are transmitted using a TS from this OS (home OS), some packets are transmitted using a probe TS, i.e., TS's from a different OS. In the described embodiment, such horizontal probes occur on a periodic basis, randomly, or according to another scheduling algorithm. The probe TS is a based upon a currently selected TS (or, equivalently, of a vertical index pointing to this TS) within the OS, and this mapping is contained in tables (probe mapping tables, not shown in this Figure). The success/failure of the probes, as expressed in the ACK/no ACK feedback in one embodiment, is stored in the OS statistics, so that after carrying out probing for a certain time period, a quality measure can be derived as to whether there is an OS that has similar or better performance than the current home OS. While many of the embodiments here illustrate operation in relation to receipt of an ACK/no ACK signal, each such reference should be understood to generally include any form of feedback that allows a transmitter to determine whether to adjust a transmit scheme to adjust a data rate. Thus, for example, an embodiment in which signal or channel quality indications are provided as feedback may readily be added to the use of ACK/no ACK or may be used in place of ACK/no ACK.

Figure 12:
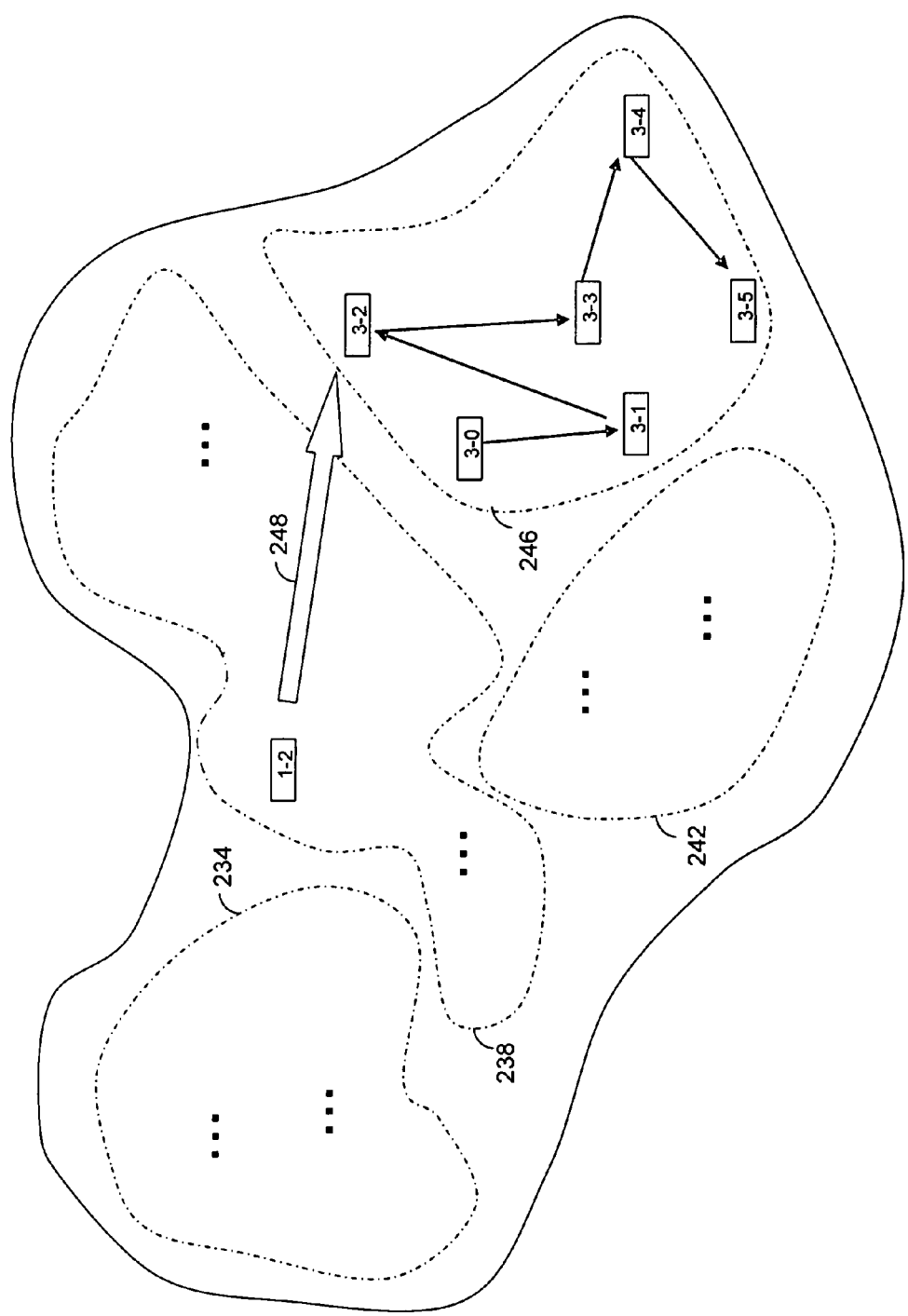
FIG. 12 is a diagram that illustrates how a certain home OS is abandoned upon a decision that another OS provides potentially better suitability for the given channel conditions.

FIG. 12 is a diagram that illustrates how a certain home OS is abandoned upon a decision that another OS provides potentially better suitability for the given channel conditions. Such a decision is based upon successful probing results as described in relation to FIG. 11. Thus, if horizontal probing of adjacent sets leads to successful probing results, the Ordered Set corresponding to the successful probes are selected for subsequent transmit schemes. As shown here in FIG. 12, successful probing of ordered set 246 for Ordered Set 238 results in the selection of the Ordered Set 246 as indicated by arrow 248. The starting point (TS) in the new home OS is given by the probe mapping tables' vertical index. The previous home TS is used as input to this table, and the output is used as the new vertical index to start vertical control in the new home OS.

Figure 13:
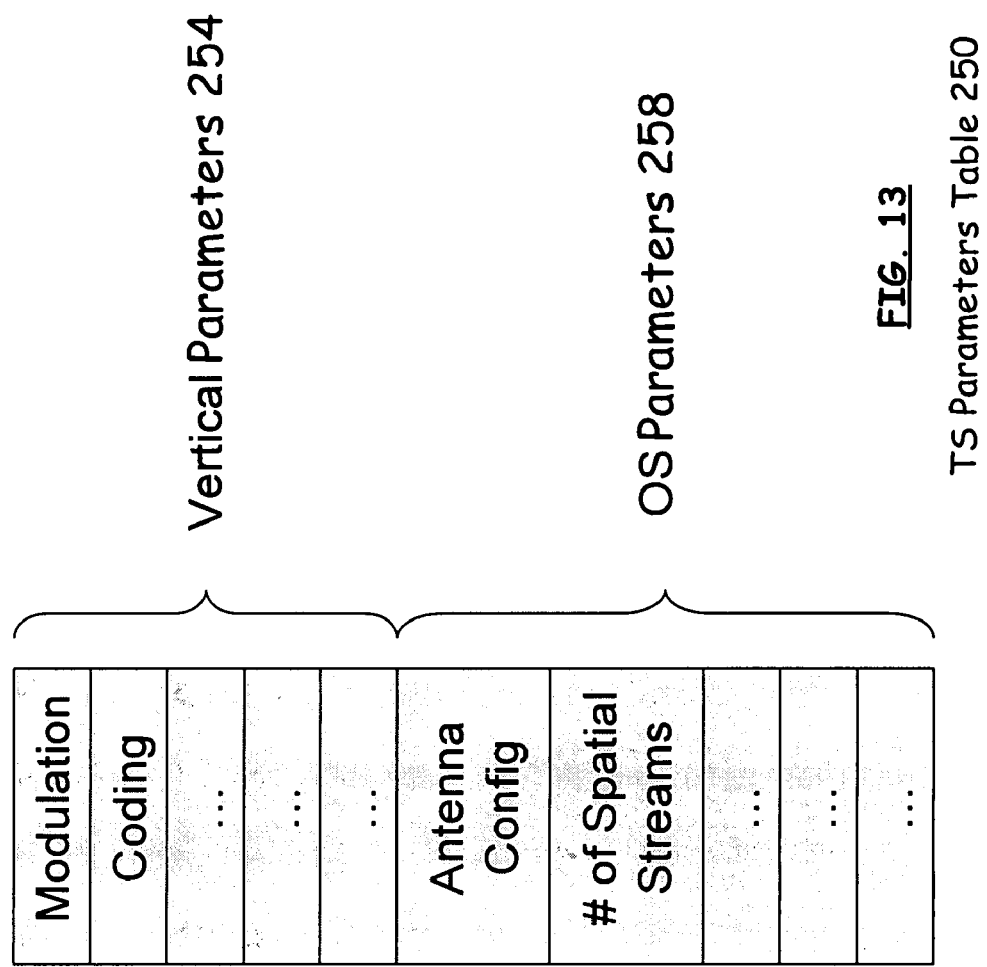
FIG. 13 is a table that shows an example of some typical TS transmit parameters and definition of typical set arrangement according to one embodiment of the invention.

FIG. 13 is a table that shows an example of some typical TS transmit parameters and definition of typical set arrangement according to one embodiment of the invention. The exemplary transmit parameters of a table 250 include Modulation Scheme, Coding (type, rate), # of spatial streams, and the antenna configuration. Other exemplary transmit parameters include specification of whether a Long or Short Guard Interval is to be used for OFDM modulation. In FIG. 13, the overall TS transmit parameters shown in Table 250 are partitioned (orthogonalized) into "vertical transmit parameters" 254 and "OS transmit parameters" 258 (or horizontal transmit parameters). Typically, the vertical transmit parameters comprise the TS transmit parameters for which the above mentioned inverse proportionality trend between rate and robustness applies, whereas "OS transmit parameters" comprise settings who lead to a less predictable impact on robustness when changed.

The vertical transmit parameters are the ones that are determined via the vertical control, while the OS transmit parameters are determined via the OS Control. For a given OS, a certain vertical TS index will correspond to certain settings (choices) of the vertical transmit parameters; this transition between vertical TS index happens in the aforementioned OS mapping table. Similarly, there will be a one-to-one correspondence between an OS index and certain settings of the OS transmit parameters. Again, the index-to-TS parameter mapping is initially stored into and, during operation, retrieved from the OS mapping table. An adaptation engine is used in one embodiment (defined within operational logic of the transmitter (e.g., BS or AP 16) to determine a quality measure for each combination of the OS transmit parameters shown in FIG. 13.

Figure 14:
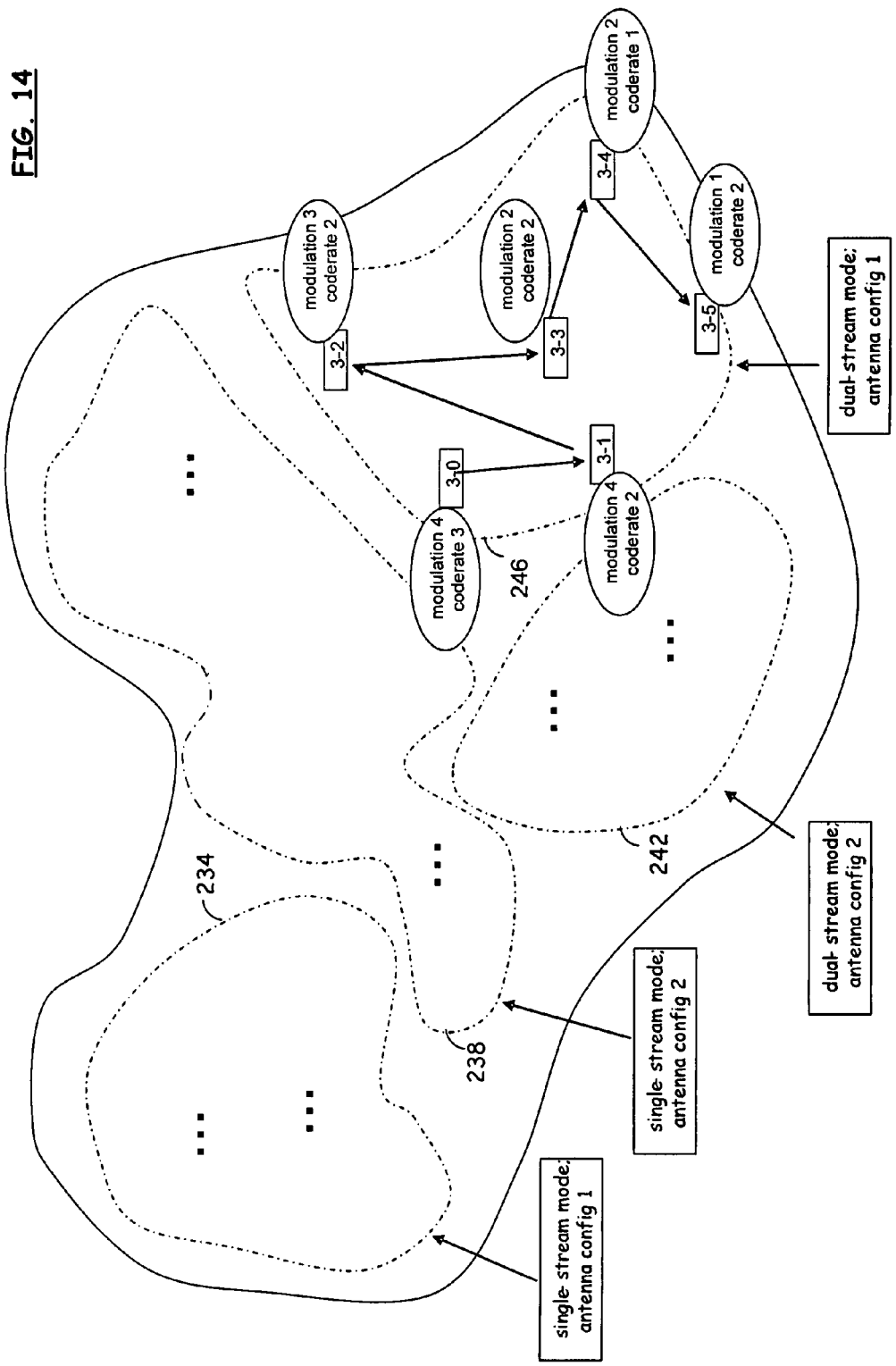
FIG. 14 is a diagram that illustrates an example of how TS transmit parameters, divided into vertical transmit parameters and horizontal transmit parameters are assigned to TS's and OS's according to one embodiment of the invention.

FIG. 14 is a diagram that illustrates an example of how TS transmit parameters, divided into vertical transmit parameters and horizontal transmit parameters are assigned to TS's and OS's according to one embodiment of the invention. FIG. 14 illustrates, for exemplary purposes, that the ordered sets may be grouped according to a common signal configuration characteristic. For example, the ordered sets are grouped according to stream mode (single or double) and antenna configuration in the described embodiment of FIG. 14. Thus, each TS within an ordered group has a common stream mode and antenna configuration.

In one embodiment of the invention for the method or the apparatus, the list of transmit parameters is partitioned in a first group of transmit parameters and a second group of transmit parameters. Each ordered set is defined as a subset of transmit schemes from the total set of transmit schemes between which the parameter settings in the first group of transmit parameters coincide. Finally, the transmit schemes within an ordered set are arranged in a logical order according to the transmission rate resulting from the parameters settings of the transmit parameters in the second group of transmit parameters. Thus, horizontal probing and horizontally adapting as defined herein generally comprises changing at least one parameter setting in the first group of transmit parameters and optionally changing one or more of parameters settings in the second group of transmit parameters. Vertically adapting, in one embodiment, comprises changing at least one parameter setting in the second group of transmit parameters and while holding the parameters settings in the first group of transmit parameters constant.

Figure 15:
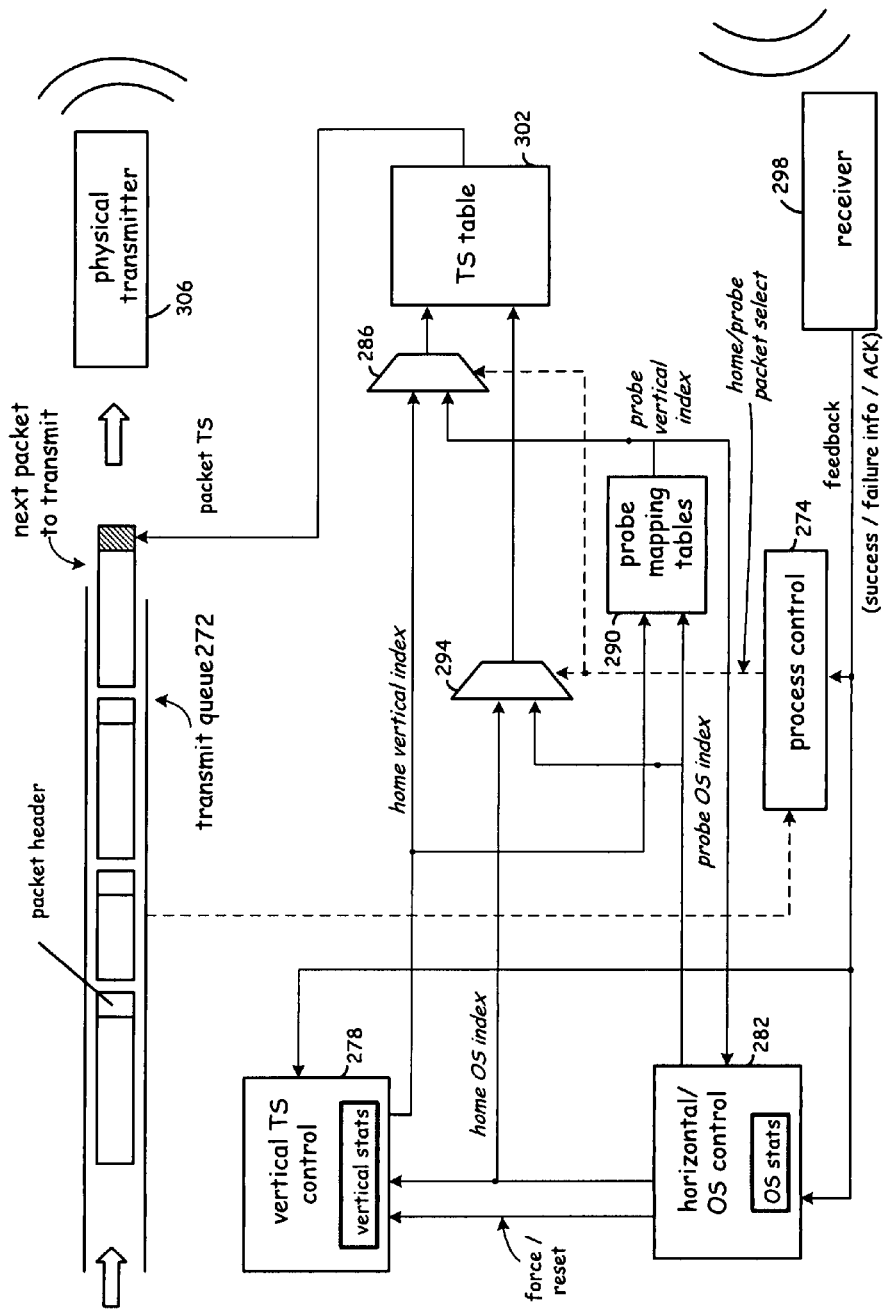
FIG. 15 is a functional block diagram that highlights a general architecture for the TS control logic described in this invention.

FIG. 15 is a functional block diagram that highlights a general architecture for the TS control logic described in this invention. TS control logic 270 includes a transmit queue 272 that contains packets queued for transmission over the air. TS control logic 270 is operable to determine a TS for the packets before they are passed to the PHY (physical layer) for transmission. The TS control logic 270 comprises three main modules, a process control module 274, a vertical control module 278 and a horizontal control module 282. Vertical control module 278 is operable to produce the home vertical index to multiplexer 286 and to probe mapping tables 290. The horizontal control module 282 is operable to produce the home OS index to probe mapping tables 290 and to multiplexer 294 and the probe OS index to probe mapping tables 290. Horizontal control module 282 also is operable to produce a force/reset signal to vertical control 278 to reset the vertical index.

The process control module 274, the horizontal control module 282 and the vertical control module 278 are each operably disposed to receive a feedback signal from a receiver 298 which feedback signal includes an indication of whether a packet was received or not received. For example, a remote transceiver will generate an ACK (acknowledge) signal to reflect that the signal was received properly and/or a signal quality indication. For example, in one embodiment of the invention, the remote transceiver may transmit a signal quality indicator such as a bit or frame or packet error rate, or channel state information or even suggest a TS to be used. Multiplexers 286 and 294 are both operably disposed to receive a home/probe packet select control signal from process control module 274 to select between home and probe packet indexing transmit parameters that are produced to TS table 302. TS table 302 then is operable to specify the TS transmit parameters to be used at the PHY layer by physical transmitter 306.

In operation, the process control module 274 is the central coordination point of the TS control logic 270 and is operable to supervise the transmit queue and to mark the packets in the transmit queue with a TS to be used in the PHY for transmission over the air. The process control module 274 distinguishes between two types of data packets: home packets (packets that will be marked with TS from the home OS) and probe packets (packets that get marked with a TS from the actual probe OS) in the described embodiment of the invention. In general, the process control module 274 uses home packets, but periodically determines to generate probe packets, based on a periodic, pseudo random or statistic based interval. The details of how the corresponding home and probe TS's are derived is explained below. One aspect of the described embodiment is that both home packets and probe packets carry regular data, i.e., they are normal data packets. It is only the assignment of a certain TS to a packet, the scheme/configuration to send out the packet on the air, that distinguishes a packet as being a home packet or a probe packet.

The vertical control unit 278 and the horizontal control unit 282 have both local memory to store indices and statistical information. The vertical control unit 278 determines a home vertical index based on collected statistics (termed stats) derived from feedback information of previously transmitted home packets. The horizontal control unit 282 determines a home OS index and a probe OS index, also based on collected statistics derived from feedback information of previously transmitted probe packets and home packets. During modem startup, all indices are initialized to a predetermined or specified default value and the memories for stats information get cleared.

In addition to the three main control units, multiplexers 286 and 294 are used to select the next packet's TS from either the home OS or the probe OS. The TS itself is determined using the home/probe OS index and a home/probe vertical index by means of probe mapping tables and a TS table.

Figure 17:
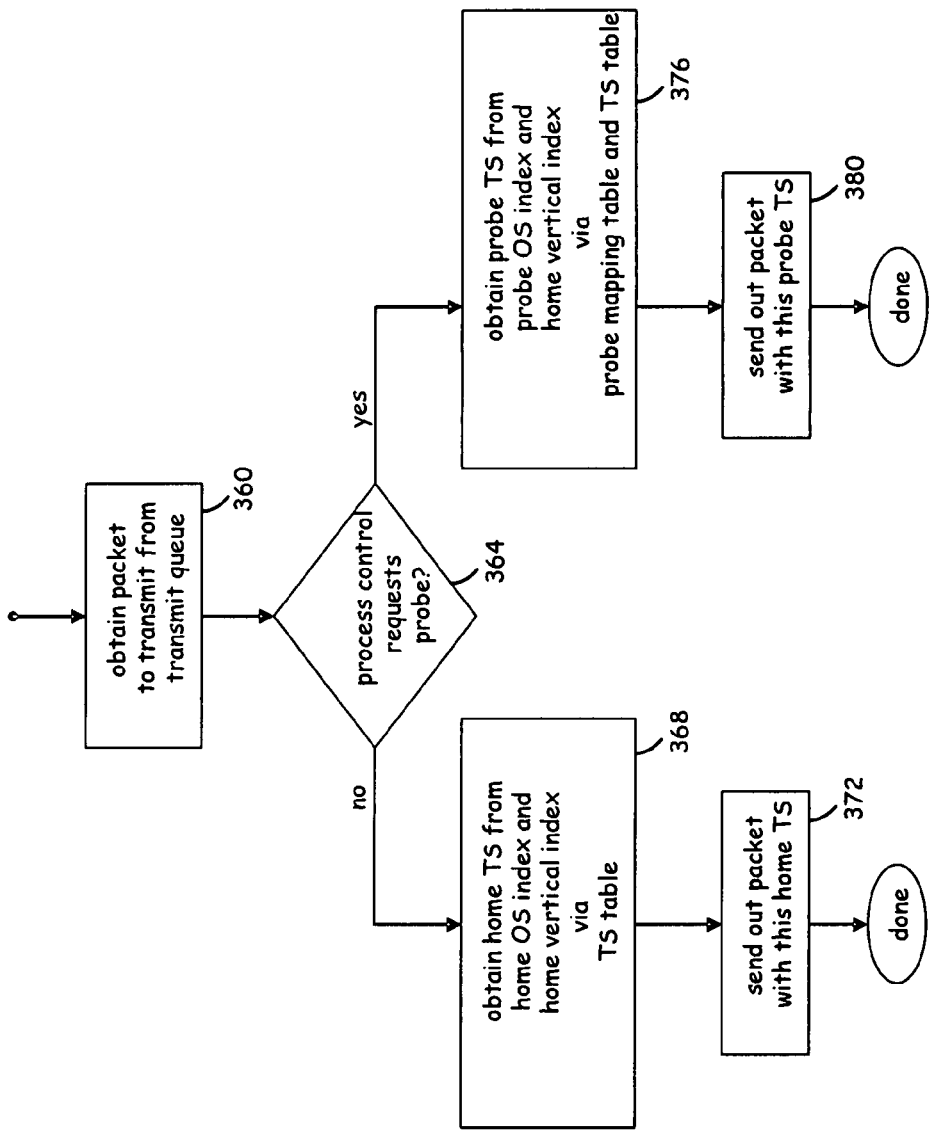
FIGS. 17 and 18 are flow charts that illustrates a method for determining a transmit scheme and for transmitting a packet according to one embodiment of the invention.
Figure 18:
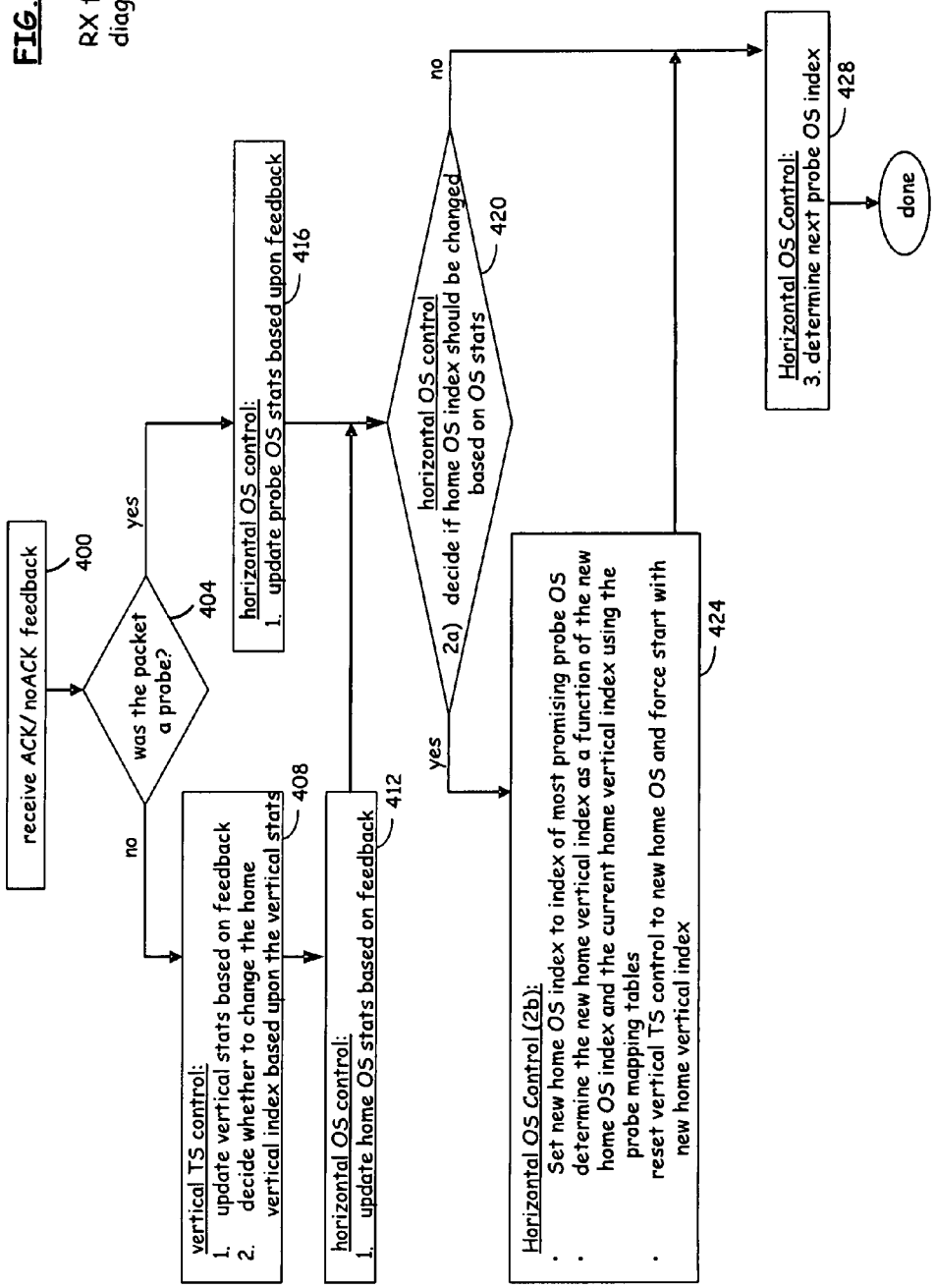

The TS adaptation process is conceptually split into two tasks: transmitting home and probe packets to excite the channel on the one hand, and processing received feedback information to adapt the TS/OS to varying channel conditions on the other hand. A flow diagram of these two tasks is depicted in FIGS. 17 and 18, respectively, and is discussed below.

Figure 16:
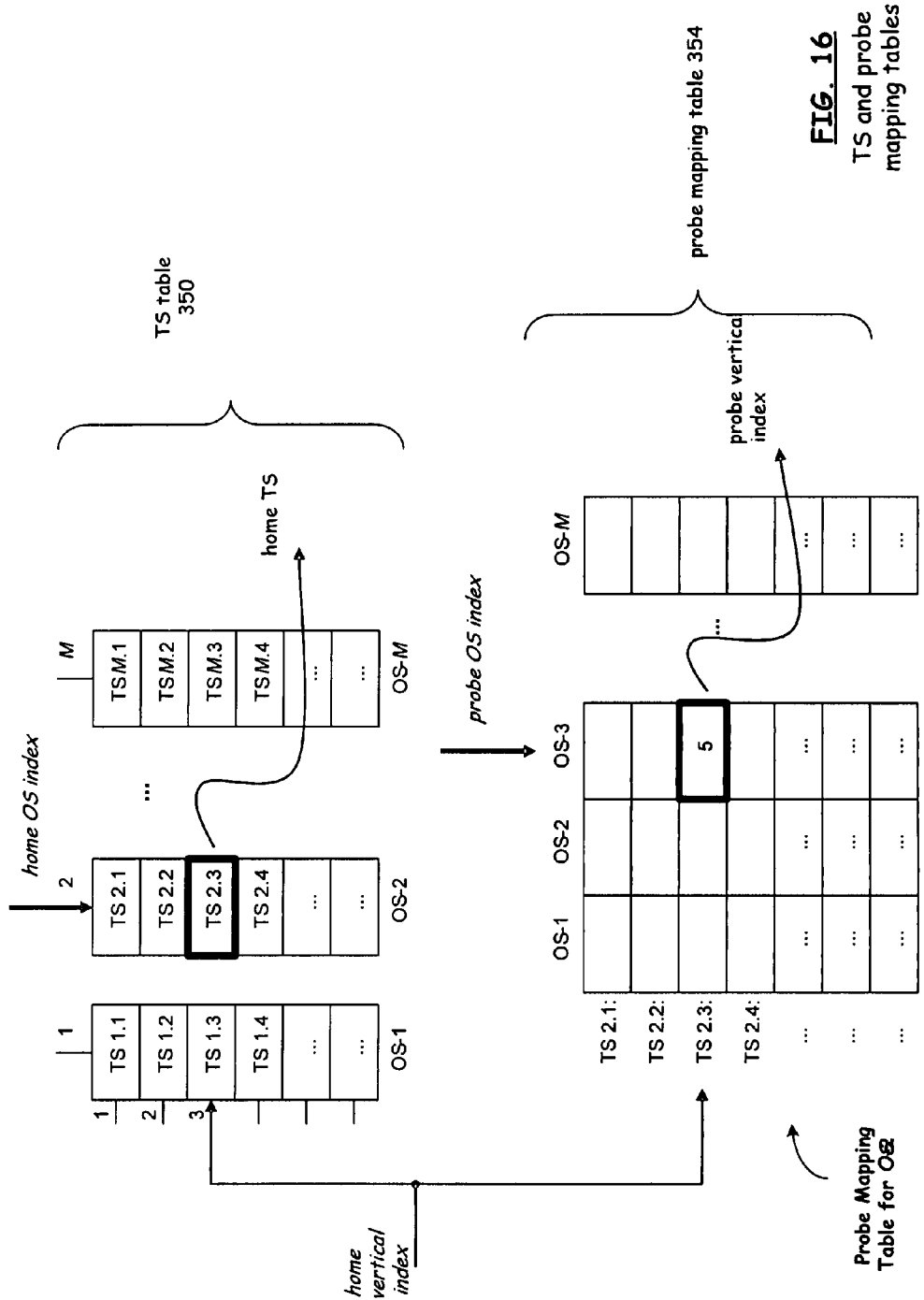
FIG. 16 is a set of tables that illustrate a method of obtaining a probe transmit scheme and a home TS according to one embodiment of the invention.

As mentioned above, each packet in the transmit queue needs to be marked with TS before it can be passed to the PHY for transmission. This task coordinated by the process control unit 274, which is operable to determine whether a packet should be designated (and transmitted) as a home packet or a probe packet. This determination of home packet versus probe packet drives the home/probe packet select line and hence determines the multiplexers selected output which ultimately selects the corresponding TS using table-Look-ups. FIGS. 16-18 illustrate this operation in greater detail.

FIG. 16 is a set of tables that illustrate a method of obtaining a probe transmit scheme and a home TS according to one embodiment of the invention. The TS of a home packet, called home TS, and is obtained by the home OS index and the vertical index by a table-Lookup in the TS table 350. This step is shown in the top part of FIG. 16. The home vertical index selects the row of the TS table 350, while the home OS index selects the column of the table 350. Each cell of the TS table 350 completely describes all the necessary transmit parameters of the specific TS.

The TS of a probe packet, called probe TS, on the other hand is obtained using the probe OS index and the probe vertical index by a two step table lookup in the probe mapping tables 354 and the TS table 350, respectively. This step is shown on the bottom part of FIG. 16. A probe mapping table that is to be used for determining a probe TS is based upon the current home OS. For example, in FIG. 16, the current home OS is OS-2. Accordingly, the set of tables shown as probe mapping tables 354 are defined for current home OS-2. A similar set of probe mapping tables is defined for each OS, namely OS-1 through OS-M.

As with the method for determining a home TS, the home vertical index selects the row of the probe mapping table. Meanwhile, the probe OS index selects the column of the table. The selected cell represents the probe vertical index. The probe TS is defined by the cell in the OS table, whose row is given by the probe vertical index and whose column by the probe OS index.

FIG. 17 is a flow chart that illustrates a method for determining a transmit scheme and for transmitting a packet according to one embodiment of the invention. Initially, a packet is obtained for transmission from a transmit queue (step 360). Thereafter, the method includes determining whether a probe packet should be generated (step 364). In one embodiment of the invention, process control module 274 of FIG. 15 makes this determination. If not, a home TS is obtained from the home OS index and home vertical index of the TS table (step 368). The packet is then transmitted with the home TS (step 372).

If the process control does require a probe, then a probe TS is obtained from the probe OS index and home vertical index of the probe mapping table and TS table (step 376). Thereafter, the packet is transmitted with the probe OS (step 380).

With reference to FIG. 18, packets that have been successfully transmitted and received at the destination node will trigger an ACK to be returned to the sender. It is assumed that an ACK is returned immediately following the packet transmission, or that there's a unique identifier (such as a sequence number), which allows a unique mapping of the ACK to transmitted packet. It is further assumed that the transmitter keeps local state which uniquely identifies whether the ACK refers to a home packet or a probe packet. If there is no explicit no ACK (NACK), we assume an existing timeout mechanisms detects a missing ACK and hence declare NACK implicitly.

A flow diagram showing the processing of the received ACK is depicted in FIG. 18. Initially, an ACK or a NACK is received (step 400). Thereafter, a determination is made as to whether the received ACK or NACK (collectively "(N)ACK") was for a probe packet (step 404). If the received (N)ACK is for a probe packet, then the horizontal control uses this feedback to update its local stats for the actual probe OS.

If the received (N)ACK is for a home packet (not a probe packet), then this feedback is first used in the vertical control unit to update stored statistics for vertical control and, based on those statistics, to subsequently decide whether to change the vertical index (and hence the rate/robustness) (step 408) in order to adapt to varying channel conditions. The same feedback is further used in the horizontal control unit to update its statistics for the actual home OS (step 412).

The remaining processing steps are identical for ACK or NACK (or other signal quality indications) if the packet was determined to be a probe packet in step 404. The probe OS stats are then updated (step 416). The horizontal control unit next decides whether the home OS index should be changed or updated (step 420). This decision is based on the OS stats and a specified optimization criteria that is determined by a user. As mentioned earlier, possible optimization goals can be, for example, either maximum throughput or maximum data rate under certain constraints. Generally, a transition to a new home OS occurs whenever the new home OS shows improved performance with respect to the specified optimization goal.

If the decision is "yes, change to a new home OS", a set of actions are performed to update the home OS (steps of 424). First, the home OS index is updated and set to the new home OS index, i.e. the most promising probe OS index. Second, the new home vertical index is derived as a function of the new home OS index and the current home vertical index by means of a probe mapping table look-up. Third, the vertical control unit is reset to the new home OS and forced to start with the new home vertical index. No action is required if the home OS remains unchanged.

Finally, the horizontal control updates probe OS index according to a periodic, pseudo random or statistic based interval (step 428). With this step, the control loop is closed and the TS Adaptation Module will continuously update OS and TS as long as data packets are available for transmission. In cases of little or no packet traffic, NULL packets can be injected to keep the Adaptation going.

FIG. 19 illustrates a TS adaptation scheme in the context of the TS tables shown on FIGS. 6 and 7. Note that FIGS. 6 and 7, together, are an example for a TS table. The overall available TS's are given by MCS's 0 through 15, where, as explained earlier, MCS-0 through 7 are single-stream rates, and MCS-8 through 15 are dual stream rates. Also note again that each MCS has a certain modulation (QAM scheme) and convolution code rate (such as ¾) associated with it, as shown on FIGS. 6 and 7.

According to one embodiment of this invention, the single stream rates MCS0-7 are assigned to Ordered Set 0 (OS-0), and dual-stream rates MCS8-15 are assigned to OS-1. Also, within these two sets, vertical Indices (V.I. in the table) are assigned, ranging from 0 through 7 in both OS's. The rightmost column in the table on FIG. 7 shows the PHY rate in Mbps that each TS can achieve. Note that for certain MCS's in the single-stream OS MCS's can be found in the dual-stream OS which have the exact same PHY rate, such as e.g., MCS-11 and MCS-5, which both have PHY rates of 108 Mbps.

Vertical control refers to the adaptation in the vertical direction within a given OS, shown via the vertical arrows in Table A of FIG. 19. For instance, if the system starts out using single stream rates (OS-0), vertical control comprises finding the vertical index within OS-0 that provides the highest PHY rate under a given packet error rate, or robustness, constraint. Typically, the higher the vertical index, the lower the robustness because of more aggressive physical TS transmit parameters and the corresponding higher PHY rate. Conversely, choosing a lower vertical index will typically lead to a more robust transmission, but a lower PHY rate. If for a given vertical index many transmissions fail, this will show up in the feedback (missing ACKs or negative ACKs), and vertical rate Control will tend to reduce the vertical index to move the system into a stable operating point. Conversely, a very robust transmission at a given vertical index (i.e., very high success rate as expressed in the feedback/ACKs), will cause the vertical control to increase the vertical index.

The probing mechanism outlined earlier and applied to this example consists in transmitting most packets with TS within a given home OS such as, e.g., OS-0, and perform vertical control based on the feedback. At the same time, however, but with a typically much smaller frequency (though a smaller or much smaller frequency is not required), some data packets are sent out using an MCS from the other OS. This mapping is illustrated with the vertical and diagonal arrows in FIG. 19. For instance, if the system's home vertical index at a given time is 5 and the home OS index is 0 (i.e., OS-0), the current default TS is MCS-5. If a probe request comes in from the Process Control, the horizontal arrow indicates that the probe should happen to vertical index 3 in OS-1. That is, the probe vertical and OS Indices are 3 and 1, respectively, which corresponds to MCS-11 as shown in the table.

The aforementioned diagonal and horizontal arrows are a representation of the probe mapping module's functionality (see also FIGS. 15 and 16). The concrete form and entries of the probe mapping tables in this example is illustrated on FIG. 19, in Table B. Note that in this example, there are two such probe mapping tables, one per OS.

As Table A indicates, in this embodiment probing tends to happen to an MCS in the other OS that has the same or very similar PHY rate. This allows the TS Adaptation, via the probing mechanism, to quantify the quality of an alternative TS that achieves about the same or higher rate compared to the current home TS. If the quality of the probe OS is sufficiently good, a transition from the home OS to the probe OS will happen, thus making the probe OS the new home OS. The benefit lies in the potential to increase the rate vertically (i.e., by increasing the vertical index) in the new home OS, which may not have been possible in the previous home OS. The probing from single-stream OS (OS-0) to dual-stream OS (OS-1) is referred to as spatial probing.

Figure 21:
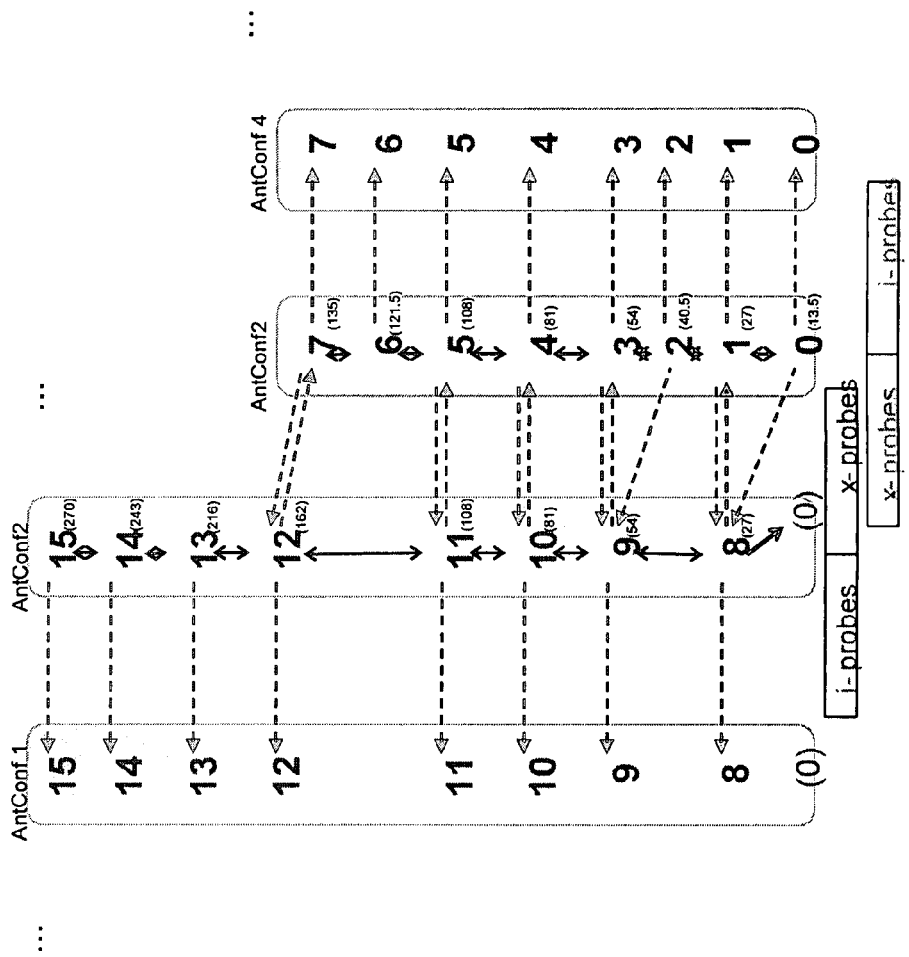

FIGS. 20 and 21 illustrate an extension of the TS Adaptation Scheme explained in FIG. 19. Here, in addition to the probing between single- and dual stream TS's, probing also happens between different antenna configurations. Assuming that there are 4 antennas, the best 2 are to be used at any given time in the described embodiment of the invention.

One way to use the two antennas for a dual-stream transmission would be a one-to-one connection between stream to antenna, but other mappings are possible. Also, for single-stream cases, in this example, the assumption is that the single stream is transmitted from two antennas, too; one beneficial way to accomplish this in practice is to transmit essentially the same signal from both antennas, but with a certain (cyclic) delay, as outlined in IEEE 802.11n. In FIG. 20, the circles indicate the 12 OS's that are defined in this scenario: Dual-stream OS's, shown on the outer ring and numbered OS-0 to OS-5, and single-stream OS's (inner ring, numbered OS-6 through OS-11). Each OS on the outer ring contains MCS 7-15 (dual stream MCS's), while each OS on the inner ring contains MCS-0 through 7 (single-stream MCS's).

Within each ring, the 6 different OS's indicate a different choice of antenna configuration but otherwise identical transmit scheme transmit parameters. Note that there are 6 possibilities to choose a pair of antennas from a set of 4 antennas.

The objective of the TS Adaptation is now to find the best combination of antenna configuration, dual versus single stream signaling, and MCS. According to the invention, the first two TS transmit parameters (the OS transmit parameters), namely, antenna configuration and single-versus-dual stream processing, are determined by the Probing mechanism. The optimal settings within each OS, i.e., the vertical index, is determined by the vertical TS Adaptation.

The Probing process between different OS's is designed to find the optimal "high-level choice" to adapt the receiver to the current channel conditions. The purpose of the vertical control is to exploit the found OS maximally in finding the highest rate within the given OS.

From a temporal perspective, the system starts out in a given OS (e.g., dual-stream in antenna configuration 0). Here, the adoption of the antenna configuration to distinguish different OS's (in addition the distinction single-stream versus dual-stream) is called Extended Spatial Probing. Probes to a different antenna configuration but with the number of streams remaining constant are called Intra-probes (I-probes), since the probe is happening within the corresponding OS ring. Probes crossing the boundaries between the outer and inner rings, i.e., probes from a single-stream OS to a dual-stream OS are called Cross-probes (X-probes), see FIGS. 20 and 21.

Figure 22:
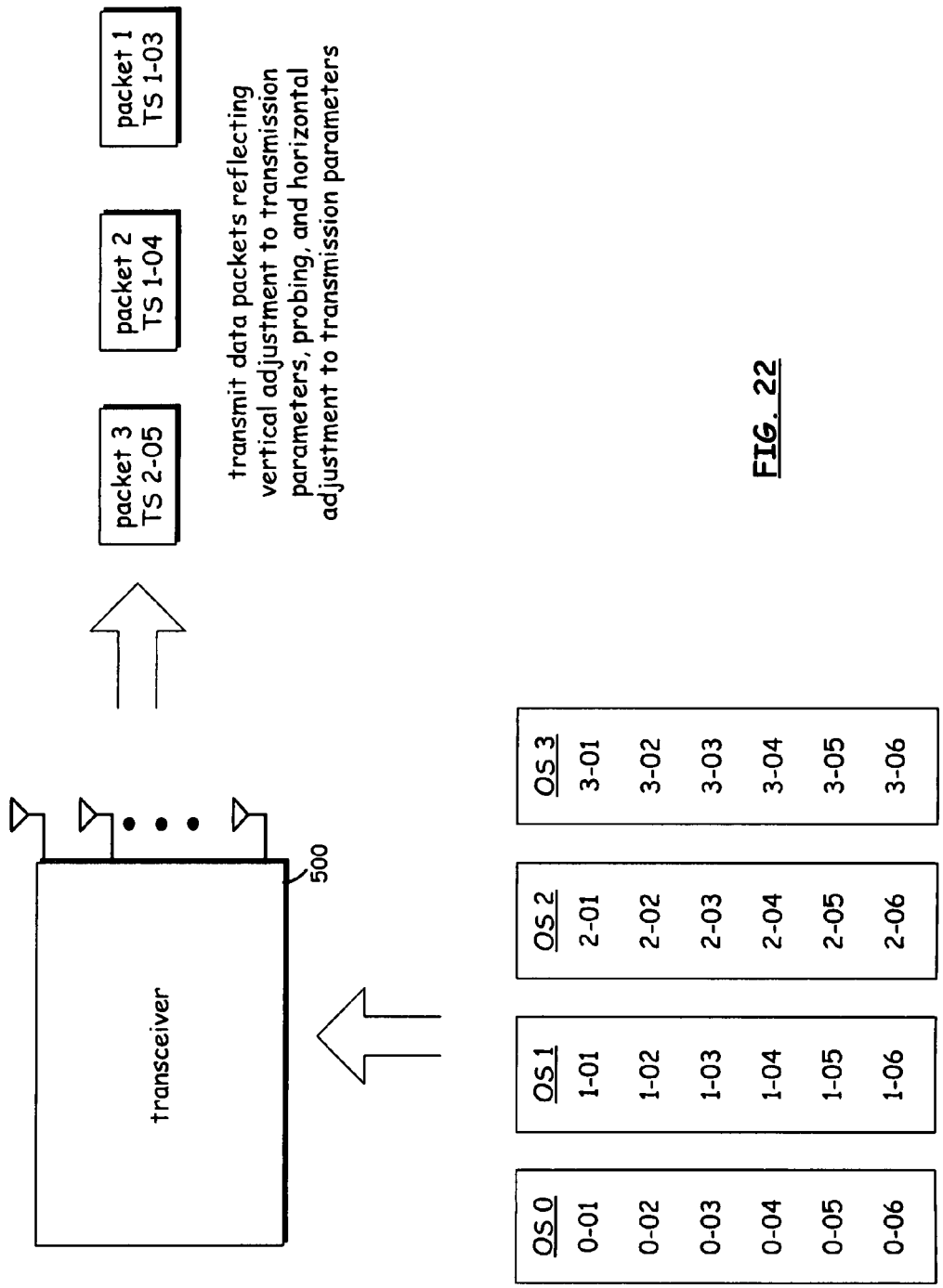
FIG. 22 is a functional block diagram illustrating one aspect of the embodiment of the present invention.

FIG. 22 is a functional block diagram illustrating one aspect of the embodiment of the present invention. For a current ordered set of transmit schemes, the transceiver 500 is operable to vertically adjust transmit schemes (hold at least one signal configuration element constant and vary others in an ordered fashion). Additionally, a probe packet is occasionally transmitted. Thus, occasionally, a packet is sent varying the signal configuration element(s) being held constant. After determining that a different ordered set is providing higher data success rates or better performance, the transceiver 500 is operable to change from the current ordered set to a different ordered set to define a new current ordered set (to horizontally adjust). As such, a new ordered set defines what signal configuration element(s) is/are held constant while others are varied according to a vertical adjustment process.

Thus, after the horizontal adjustment, the transmitter vertically adjusts transmit schemes according to the new ordered set. As before, the transceiver will occasionally send a packet varying the constant signal configuration element and the process is repeated with the new current set.

The discussion of the logic for determining transmit schemes reflects but one embodiment of the invention. More generally, the invention includes logically adjusting transmit schemes in a manner that accounts for radio capabilities including the transmission of a plurality of spatial streams over one or more antennas and for configuring antennas to support one or more spatial streams. From an external perspective, the transceiver is operable to demonstrate variation of transmit schemes in a logical or ordered manner that is consistent with logic for using new transmit schemes which result in specified signal configuration elements being held in a constant mode while other configuration elements are varied according to a vertical adjustment approach. The transceiver will occasionally generate probe packets also which may be seen by the variation of a signal configuration element that has been typically used in constant and non-varying manner and then the subsequent return to holding that element constant until such time that it is clear that a horizontal adjustment has occurred.

Each description of the figures herein is exemplary. It should be understood that the present embodiments of the invention relate to transmit scheme determination for a plurality of transmitters including OFDM transmitters.

As one of ordinary skill in the art will appreciate, the term "substantially" or "approximately", as may be used herein, provides an industry-accepted tolerance to its corresponding term and/or relativity between items. Such an industry-accepted tolerance ranges from less than one percent to twenty percent and corresponds to, but is not limited to, component values, integrated circuit process variations, temperature variations, rise and fall times, and/or thermal noise. Such relativity between items ranges from a difference of a few percent to magnitude differences. As one of ordinary skill in the art will further appreciate, the term "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of ordinary skill in the art will also appreciate, inferred coupling (i.e., where one element is coupled to another element by inference) includes direct and indirect coupling between two elements in the same manner as "operably coupled".

While the invention is susceptible to various modifications and alternative forms, specific embodiments thereof have been shown by way of example in the drawings and detailed description. It should be understood, however, that the drawings and detailed description thereto are not intended to limit the invention to the particular form disclosed, but, on the contrary, the invention is to cover all modifications, equivalents and alternatives falling within the spirit and scope of the present invention as defined by the claims. As may be seen, the described embodiments may be modified in many different ways without departing from the scope or teachings of the invention.

What is claimed is:

1. A method for transmitting data packets according to a selected transmit scheme having a transmission data rate, comprising:

selecting a data packet transmit scheme from one of a plurality of ordered sets of transmit schemes wherein a total set of defined transmit schemes is distributed over the plurality of ordered sets based upon a logical ordering, and further wherein the ordered sets comprise transmit schemes that are arranged according to one of the transmission data rate and transmission robustness;

transmitting one of a packet fragment or a packet using a signal configuration based upon the selected transmit scheme;

receiving feedback comprising an indication of at least one of a successful transmission, an unsuccessful transmission, a signal quality indication and a channel quality indication;

vertically adapting the transmit scheme within the current ordered set of transmit schemes wherein vertically adapting the transmit scheme comprises one of remaining on a currently selected transmit scheme within the current ordered set or selecting the next lower or next higher transmit scheme in the current ordered set to maximize a first transmission performance metric within the current ordered set;

replacing the transmit scheme for some packets with a probe transmit scheme, wherein the probe transmit scheme is a transmit scheme from a different ordered set of the plurality of ordered sets, whereby the probe transmit scheme is given as an output argument based upon the currently chosen transmit scheme as input argument; and collecting success/failure statistics for each probe transmit scheme ordered set to determine if transmit schemes from an ordered set of the plurality of ordered sets improves transmission performance over the current ordered set, the determining further including comparing collected statistics between various probe ordered sets and horizontally adapting to one of the probe ordered sets when a specified transmission performance metric is met, whereby horizontally adapting means that the probe ordered set becomes the new currently chosen ordered set and that steps of vertically adapting starts again in the new currently chosen ordered set from a transmit scheme that is a function of the last currently chosen transmit scheme.

2. The method of claim 1 wherein selecting the transmit scheme includes setting a plurality of transmit parameters with specific parameter settings wherein the transmit parameters include at least one of a number of spatial streams, code rate, modulation type, antenna configuration, and OFDM guard interval length.

3. The method of claim 2 wherein the parameter settings for the number of spatial streams ranges from 1 to 100, wherein the code rate is one of 1/2, 2/3, 3/4 or 5/6, wherein the modulation type is one of BPSK, QPSK, 8-PSK, 16-QAM, 32-QAM, 64-QAM, 128-QAM or 256-QAM, wherein the antenna configuration includes at least one selected antenna of a plurality of antennas, and wherein the OFDM guard interval length is in the range of 50 nanoseconds to 2 microseconds.

4. The method of claim 2 wherein:
the list of transmit parameters is partitioned in a first group of transmit parameters and a second group of transmit parameters;
each ordered set is defined as a subset of transmit schemes from the total set of transmit schemes between which the parameter settings in the first group of transmit parameters coincide; and
the transmit schemes within an ordered set are arranged in a logical order according to the transmission rate resulting from the parameter settings of the transmit parameters in the second group of transmit parameters.

5. The method of claim 4 wherein horizontally adapting comprises changing at least parameter setting in the first group of transmit parameters and optionally changing one or more parameter settings in the second group of transmit.

6. The method of claim 4 wherein vertically adapting comprises changing at least one parameter setting in the second group of transmit parameters and while holding the parameters settings in the first group of transmit parameters constant.

7. The method of claim 4 wherein the first group of transmit parameters comprises at least one of the number of spatial streams, the antenna configuration, and the OFDM guard interval length.

8. A method in a digital communication system for transmitting a sequence of data packets, comprising:
selecting a transmit scheme for each packet from a multitude of available transmit schemes and receiving immediate feedback on the success/failure of each packet transmission wherein the multitude of transmit schemes are arranged in a plurality of ordered sets that each defines an order of the transmit schemes contained within;
selecting a transmit scheme for packet transmissions and subsequently remaining on the currently selected transmit scheme within a currently selected ordered set or selecting an adjacent lower or higher transmit scheme in the ordered set to maximize a first transmission performance metric within the ordered set based on a specified vertical adaptation technique;
replacing the transmit scheme for at least one packet with a probe transmit scheme, whereby the probe transmit scheme is given as output argument from a table lookup using the currently chosen transmit scheme as input argument;
collecting success/failure statistics for each probe ordered set whereby probe ordered set's are the ordered set that probe transmit schemes are taken from; and
comparing the collected statistics between various probe ordered set's and horizontally adapting to one of the probe ordered sets when a second transmission performance metric is met.

9. The method of claim 8 further including for the new currently selected ordered set, remaining on the new currently selected transmit scheme within a currently selected ordered set or selecting the next lower or higher transmit scheme in the ordered set to maximize the first transmission performance metric within the ordered set based on a vertical adaptation technique.

10. Apparatus to adapt a transmit scheme for data packet transmissions in wireless transceivers, comprising:
a transmit scheme adaptation module that determines a transmit scheme of each outgoing packet by processing success/failure statistics of previously transmitted packets;
logic that generates a number of ordered sets of transmit schemes, each containing a number of transmit schemes;
probe mapping tables containing a list of target ordered sets and corresponding target transmit schemes for each transmit scheme in all ordered sets;
a vertical transmit scheme control unit to determine, within a current ordered set of transmit schemes following a specified rate adaptation scheme to be used for on-going data transmissions based upon a currently chosen transmit scheme selected by the transmit scheme adaptation module;
a process control unit operable to request one or more subsequent packets to be transmitted from a transmit module to a remote transceiver using one of the probe transmit schemes from the probe mapping table of the current ordered set of transmit schemes;
an ordered set control unit operable to collect success/failure statistics of on-going data transmissions in the current ordered set of transmit schemes based upon feedback information from the remote transceiver and further operable to probe transmit schemes to derive quality measures for the current home ordered set and probe ordered set; and
wherein the ordered set control unit is operable to abandon the current ordered set of transmit schemes and to transition to a new ordered set of transmit schemes based upon collected data when a quality of the target ordered set exceeds a specified threshold of the current home ordered set quality.

* * * * *

UNITED STATES PATENT AND TRADEMARK OFFICE
CERTIFICATE OF CORRECTION

| | | |
|---|---|---|
| PATENT NO. | : 8,040,843 B2 | |
| APPLICATION NO. | : 11/875161 | |
| DATED | : October 18, 2011 | |
| INVENTOR(S) | : Furrer et al. | |

It is certified that error appears in the above-identified patent and that said Letters Patent is hereby corrected as shown below:

Col. 23, line 38, in claim 5: after "transmit" insert --parameters--

Signed and Sealed this
Nineteenth Day of February, 2013

Teresa Stanek Rea
*Acting Director of the United States Patent and Trademark Office*